United States Patent
Mildh et al.

(10) Patent No.: US 12,035,401 B2
(45) Date of Patent: *Jul. 9, 2024

(54) UE BEHAVIOR WITH REJECTION OF RESUME REQUEST

(71) Applicant: Telefonaktiebolaget LM Ericsson (publ), Stockholm (SE)

(72) Inventors: Gunnar Mildh, Sollentuna (SE); Icaro Leonardo J. da Silva, Solna (SE)

(73) Assignee: Telefonaktiebolaget LM Ericsson (publ), Stockholm (SE)

(*) Notice: Subject to any disclaimer, the term of this patent is extended or adjusted under 35 U.S.C. 154(b) by 0 days.

This patent is subject to a terminal disclaimer.

(21) Appl. No.: 18/132,648

(22) Filed: Apr. 10, 2023

(65) Prior Publication Data

US 2023/0247706 A1    Aug. 3, 2023

Related U.S. Application Data

(63) Continuation of application No. 17/009,691, filed on Sep. 1, 2020, now Pat. No. 11,627,625, which is a
(Continued)

(51) Int. Cl.
*H04W 76/18*    (2018.01)
*H04W 68/00*    (2009.01)
*H04W 76/27*    (2018.01)

(52) U.S. Cl.
CPC ......... *H04W 76/18* (2018.02); *H04W 68/005* (2013.01); *H04W 76/27* (2018.02)

(58) Field of Classification Search
CPC .... H04W 76/18; H04W 76/27; H04W 68/005
See application file for complete search history.

(56) References Cited

U.S. PATENT DOCUMENTS

| 2017/0027006 A1 | 1/2017 | Vikberg |
| 2018/0092157 A1 | 3/2018 | Chen |

(Continued)

FOREIGN PATENT DOCUMENTS

| CN | 106954270 A | 7/2017 |
| CN | 110636572 A | 12/2019 |

(Continued)

OTHER PUBLICATIONS

Author Unknown, "Technical Specification Group Radio Access Network; NR; Radio Resource Control (RRC) protocol specification (Release 15)," Technical Specification 38.331, Version 15.1.0, Mar. 2018, 3GPP Organizational Partners, 268 pages.

(Continued)

*Primary Examiner* — Charles T Shedrick
(74) *Attorney, Agent, or Firm* — Withrow & Terranova, PLLC

(57) ABSTRACT

Systems and methods are disclosed herein relating to wireless device behavior after rejection of a resume request triggered by a Radio Access Network (RAN) based Notification Area Update (RNAU) or upon cell reselection during resume. In some embodiments, a method of operation of a wireless device comprises transmitting, to a RAN node, a Radio Resource Control (RRC) resume request triggered by an RNAU and receiving, from the RAN node, an RRC resume reject message comprising a wait timer value in response to the RRC resume request. The method further comprises starting a wait timer initialized with the wait timer value and sending the RNAU when the wait timer has expired. Corresponding embodiments of a wireless device are also disclosed. Embodiments of a wireless device and methods of operation thereof related to the behavior of the wireless device upon performing a cell reselection during resume are also disclosed.

8 Claims, 15 Drawing Sheets

Related U.S. Application Data continuation of application No. PCT/IB2019/053617, filed on May 2, 2019.

(60) Provisional application No. 62/669,822, filed on May 10, 2018.

(56) References Cited

U.S. PATENT DOCUMENTS

| | | |
|---|---|---|
| 2018/0332462 A1 | 11/2018 | Kim et al. |
| 2019/0159082 A1 | 5/2019 | Talebi Fard et al. |
| 2019/0200265 A1 | 6/2019 | Yu et al. |
| 2019/0215887 A1 | 7/2019 | Burbidge et al. |
| 2019/0223151 A1 | 7/2019 | Li et al. |
| 2019/0246318 A1 | 8/2019 | Kim et al. |
| 2019/0268827 A1 | 8/2019 | Kim et al. |
| 2019/0289661 A1 | 9/2019 | Chen |
| 2019/0320316 A1 | 10/2019 | Mildh et al. |
| 2019/0327647 A1 | 10/2019 | Ozturk et al. |
| 2019/0342821 A1 | 11/2019 | Kim et al. |
| 2019/0394833 A1 | 12/2019 | Talebi Fard et al. |
| 2020/0120477 A1 | 4/2020 | Mildh et al. |
| 2020/0178343 A1 | 6/2020 | Kim et al. |
| 2020/0214070 A1 | 7/2020 | Ingale et al. |
| 2020/0221524 A1 | 7/2020 | Jiang |
| 2020/0229263 A1 | 7/2020 | Rajadurai et al. |
| 2020/0275508 A1 | 8/2020 | Hu et al. |
| 2020/0314955 A1 | 10/2020 | Velev et al. |
| 2020/0336891 A1 | 10/2020 | Guo et al. |
| 2021/0022200 A1 | 1/2021 | Mildh et al. |

FOREIGN PATENT DOCUMENTS

| | | |
|---|---|---|
| RU | 2477582 C2 | 3/2013 |
| WO | 2018062848 A1 | 4/2018 |

OTHER PUBLICATIONS

Author Unkown, "R2-1805355: CR on Connection Control ([101#37][NR] RRC procedures/messages)," 3GPP TSG-RAN WG2 Meeting #101Bis, Apr. 16-20, 2018, Sanya, China, 309 pages.

Ericsson, "Tdoc R2-1807920: Actions upon cell reselection while T300X is running," 3GPP TSG-RAN WG2 #102, May 21-25, 2018, 5 pages, Busan, Korea.

Ericsson, "Tdoc R2-1804857: Wait Timer in NR", 3GPP TSG-RAN WG2 #101-Bis, Apr. 16-20, 2018, Sanya, P.R. of China, 2 pages.

Ericsson, "R2-1805352: Summary of agreements on connection control," 3GPP TSG-RAN WG2 #101Bis, Sanya, P.R. of China, Apr. 16-20, 2018, 16 pages.

Ericsson, "Tdoc R2-1807922: Resuming after Reject with wait timer," 3GPP TSG-RAN WG2 #102, May 21-25, 2018, Busan, Korea, 4 pages.

Fujitsu: "R2-1804946: Remaining issues on RAN-based notification area update procedure", 3GPP TSG-RAN WG2 Meeting #101bis, Apr. 16-20, 2018, Sanya, China, 4 pages.

Intel, et al., "R2-1806371: Stage 3 RRC TP on RRC_INACTIVE state for E-UTRA connected to 5GC," 3GPP TSG- RAN2 Meeting #101bis, Apr. 16-20, 2018, Sanya, China, 59 pages.

Panasonic, "R2-083318: Paging monitoring behaviour for RRC connection reject case", 3GPP TSG RAN WG2 #62bis, Jun. 30-Jul. 4, 2008, Warsaw, Poland, 2 pages.

Qualcomm Incorporated, "R2-1803778: Report of Email Discussion [NR-AH1801#14][NR] RRC inactive procedures," 3GPP TSG-RAN WG2 Meeting #101, Feb. 26-Mar. 2, 2018, Athens, Greece, 16 pages.

ZTE Corporation, et al., "R2-1712597: Consideration on the UAC category," 3GPP TSG RAN WG2 Meeting #100, Nov. 27-Dec. 1, 2017, Reno, Nevada, 2 pages.

ZTE Corporation, "R2-1807321: Open aspects of AS/NAS interactions for RRC Reject procedure", 3GPP TSG-RAN WG2 Meeting#102, May 21-25, 2018, Busan, Korea, 4 pages.

Examination Report for Australian Patent Application No. 2019265694, dated Jul. 23, 2021, 5 pages.

Examination Report for European Patent Application No. 19730934. 7, dated Nov. 9, 2022, 6 pages.

Examination Report for European Patent Application No. 19730934. 7, dated Dec. 20, 2022, 4 pages.

Notice of Reasons for Refusal for Japanese Patent Application No. 2020-561887, dated Dec. 21, 2021, 10 bages.

Notice of Reasons for Refusal for Japanese Patent Application No. 2020-561887, dated Jul. 12, 2022, 5 pages.

Notification of Reason for Refusal for Korean Patent Application No. 10-2020-7035533, dated Nov. 8, 2021, 10 pages.

Office Action for Russian Patent Application No. 2020140451/07, dated Jul. 6, 2021, 12 pages.

International Search Report and Written Opinion for International Patent Application No. PCT/IB2019/053617, dated Oct. 14, 2019, 16 pages.

Pre-Interview Communication for U.S. Appl. No. 17/009,691, dated Oct. 27, 2020, 3 pages.

First Action Interview Office Action Summary and Applicant—Initiated Interview Summary for U.S. Appl. No. 17/009,691, dated Dec. 15, 2020, 5 pages.

Non-Final Office Action for U.S. Appl. No. 17/009,691, dated Apr. 19, 2021, 6 pages.

Final Office Action for U.S. Appl. No. 17/009,691, dated Aug. 12, 2021, 10 pages.

Advisory Action and Examiner-Initiated Interview Summary for U.S. Appl. No. 17/009,691, dated Nov. 9, 2021, 9 pages.

Applicant-Initiated Interview Summary for U.S. Appl. No. 17/009,691, dated Feb. 22, 2022, 2 pages.

Non-Final Office Action for U.S. Appl. No. 17/009,691, dated Feb. 28, 2022, 12 pages.

Final Office Action for U.S. Appl. No. 17/009,691, dated Jun. 16, 2022, 5 pages.

Intel Corporation, "R2-1805015: Open issues related to connection resume procedure," 3GPP TSG RAN WG2 Meeting #101bis, Apr. 16-20, 2018, Sanya, China, 3 pages.

Examination Report for European Patent Application No. 19730934. 7, dated Apr. 25, 2023, 12 pages.

First Office Action for Chinese Patent Application No. 201980031069. 1, dated Nov. 22, 2023, 11 pages.

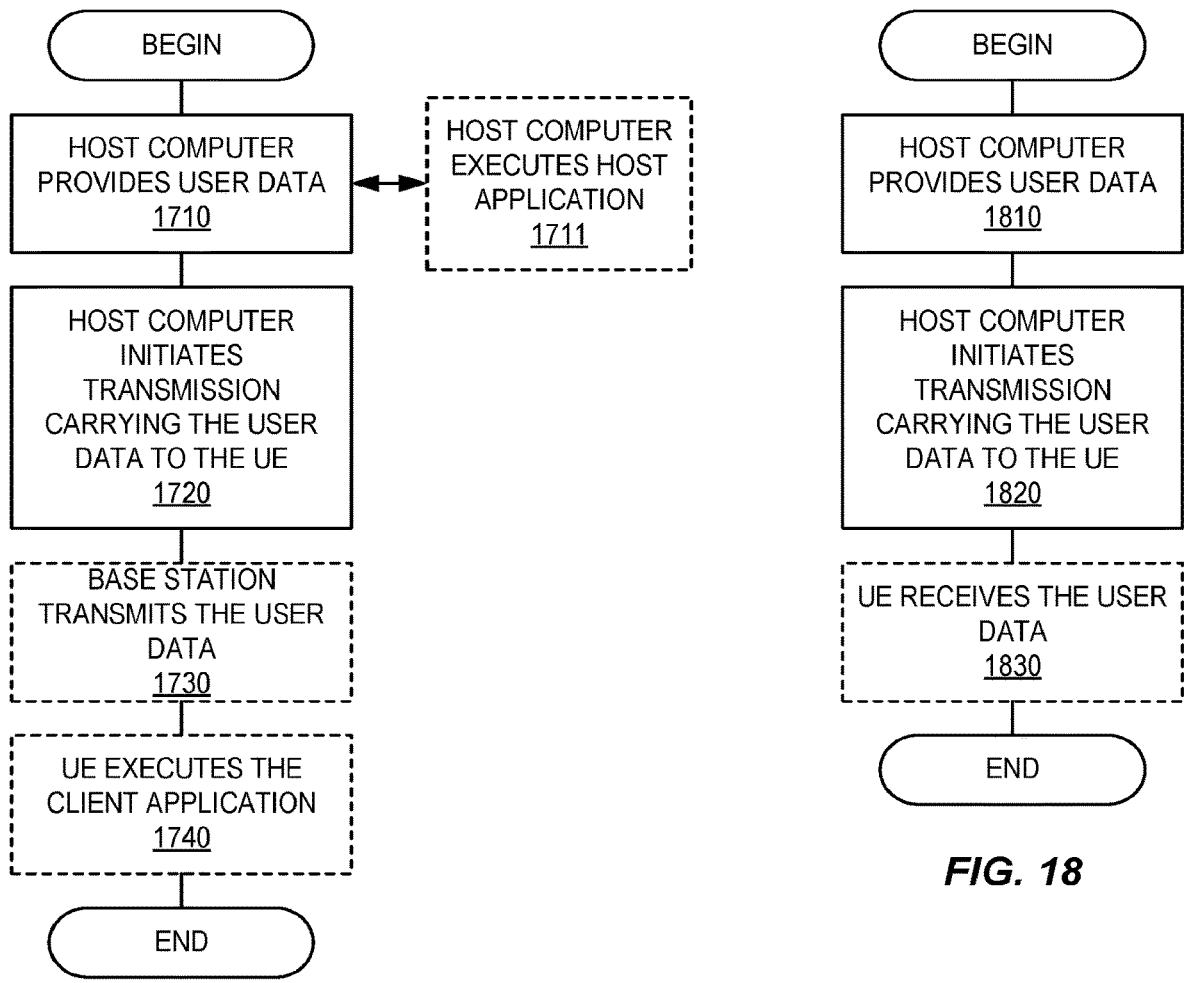

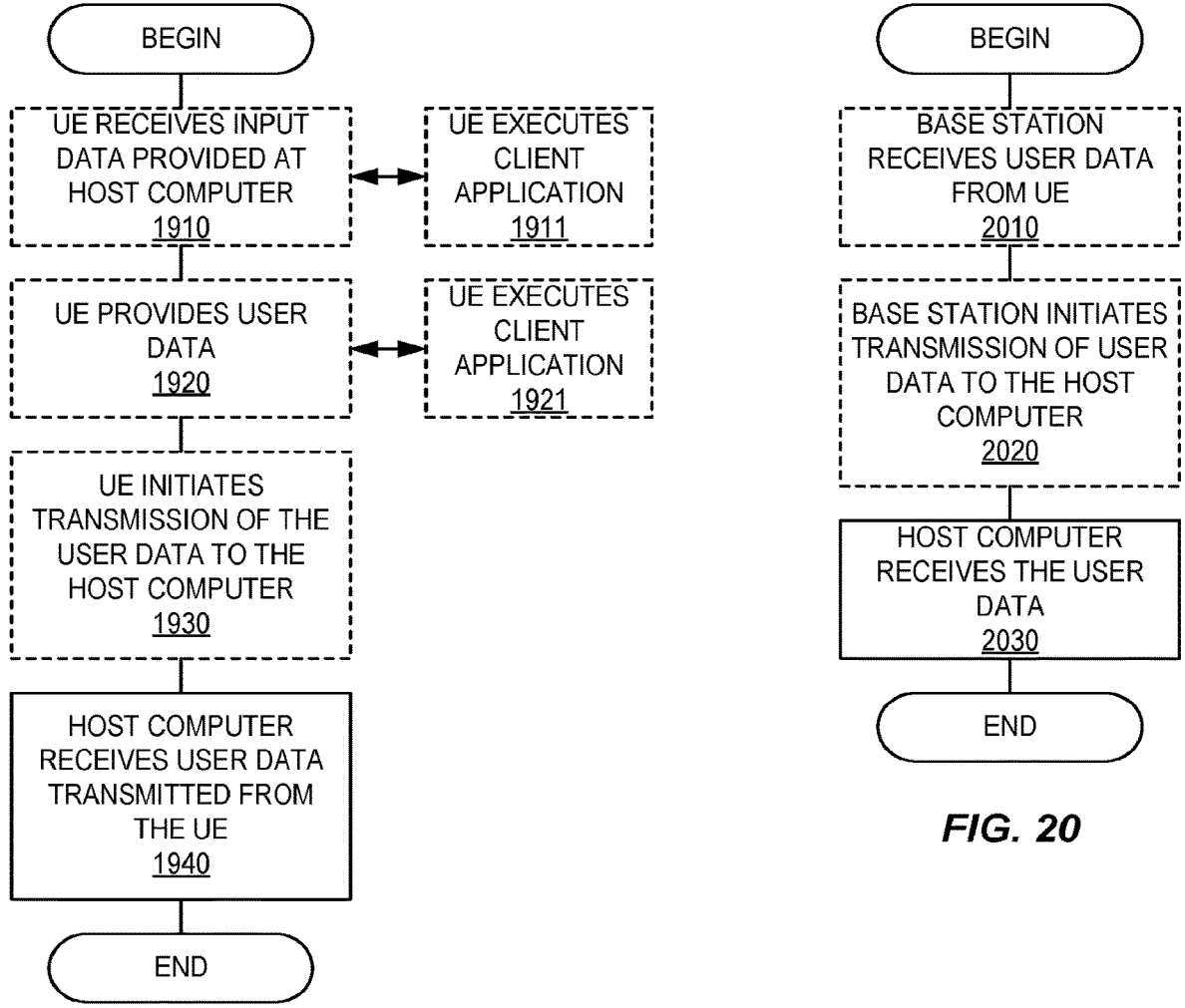

UE BEHAVIOR WITH REJECTION OF RESUME REQUEST

RELATED APPLICATIONS

This application is a continuation of U.S. patent application Ser. No. 17/009,691, filed Sep. 1, 2020, now U.S. Pat. No. 11,627,625, which is a continuation of International patent application serial number PCT/IB2019/053617, filed May 3, 2019, which claims the benefit of U.S. provisional patent application Ser. No. 62/669,822, filed May 10, 2018, the disclosures of which are hereby incorporated herein by reference in their entirety.

TECHNICAL FIELD

The present disclosure relates to resuming a connection in a cellular communications system and, more specifically, to User Equipment (UE) behavior associated with resuming a connection in a cellular communications system.

BACKGROUND

Radio Resource Control (RRC) Connection Resume in Long Term Evolution (LTE)

In the Third Generation Partnership Project (3GPP) LTE standard Release 13, a mechanism was introduced for the User Equipment (UE) to be suspended by the network in a suspended state similar to RRC_IDLE but with the difference that the UE stores the Access Stratum (AS) context or RRC context. This makes it possible to reduce the signaling when the UE is becoming active again by resuming the RRC connection, instead of establishing the RRC connection from scratch. Reducing the signaling could have several benefits, namely, reduced latency, e.g. for smart phones accessing the Internet, and reduced signaling that leads to reduced battery consumption for machine type devices sending very little data.

The Release 13 solution is based on having the UE send an RRCConnectionResumeRequest message to the network and, in response, receive an RRCConnectionResume from the network. The RRCConnectionResume is not encrypted but integrity protected.

RRC_INACTIVE in New Radio (NR) and Possibly in LTE Release 15

As part of the standardized work on Fifth Generation (5G) NR in 3GPP, it has been decided that NR should support an RRC_INACTIVE state with similar properties as the suspended state in LTE Release 13. The RRC_INACTIVE state has slightly different properties from the LTE state in that it is a separate RRC state and not part of RRC_IDLE as in LTE.

Additionally, the Core Network (CN)/Radio Access Network (RAN) connection (NG or N2 interface) is kept for RRC_INACTIVE while it was suspended in LTE.

FIG. 1 is a flow diagram showing possible state transitions between in NR. The properties of the states depicted in FIG. 1 are as follows:

RRC_IDLE:
  A UE specific Discontinuous Reception (DRX) may be configured by upper layers;
  UE controlled mobility based on network configuration;
  The UE:
    Monitors a Paging channel for CN paging using 5G-System Architecture Evolution Temporary Mobile Subscriber Identity (S-TMSI);
    Performs neighboring cell measurements and cell (re-)selection;
    Acquires system information.
RRC_INACTIVE:
  A UE specific DRX may be configured by upper layers or by RRC layer;
  UE controlled mobility based on network configuration;
  The UE stores the AS context;
  The UE:
    Monitors a Paging channel for CN paging using 5G-S-TMSI and RAN paging using Inactive Radio Network Temporary Identifier (I-RNTI);
    Performs neighboring cell measurements and cell (re-)selection;
    Performs RAN-based notification area updates periodically and when moving outside the RAN-based notification area;
    Acquires system information.
RRC CONNECTED:
  The UE stores the AS context;
  Transfer of unicast data to/from UE;
  At lower layers, the UE may be configured with a UE specific DRX;
  For UEs supporting Carrier Aggregation (CA), use of one or more Secondary Cells (SCells), aggregated with the Special Cell (SpCell), for increased bandwidth;
  For UEs supporting Dual Connectivity (DC), use of one Secondary Cell Group (SCG), aggregated with the Master Cell Group (MCG), for increased bandwidth;
  Network controlled mobility, i.e. handover within NR and to/from Evolved Universal Terrestrial RAN (E-UTRAN);
  The UE:
    Monitors a Paging channel;
    Monitors control channels associated with the shared data channel to determine if data is scheduled for it;
    Provides channel quality and feedback information;
    Performs neighboring cell measurements and measurement reporting;
    Acquires system information.

Current Resume Procedure

For UEs in RRC_INACTIVE, there is a need to perform an RRC connection resume procedure in the following cases:
  when UE is responding to RAN paging,
  when UE has uplink (UL) data to send,
  when UE needs to perform Non-Access Stratum (NAS) signaling, or
  when UE needs to perform AS signaling (e.g., Radio Notification Area Update (RNAU) due to periodic timeout or due to mobility). Note that a RNAU is also sometimes referred to as a RAN-based Notification Area Update.
In all cases above, the UE would initiate the resume procedure as described below. Different cause values would be used in the ResumeRequest message depending on the reason for the resume.

The purpose of this procedure is to resume an RRC connection including resuming Signaling Radio Bearer(s) (SRB(s)) and Data Radio Bearer(s) (DRB(s)) or perform a RAN-based Notification Area (RNA) update (i.e., a RNAU). The resume procedure is depicted with respect to FIGS. 2 through 6 and described below.

```
5.3.13       RRC connection resume
5.3.13.1        General
                    [REPRODUCED HEREIN AS FIG. 2]
        FIG. 5.3.13.1-1: RRC connection resume, successful
                    [REPRODUCED HEREIN AS FIG. 3]
        FIG. 5.3.13.1-2: RRC connection resume fallback to RRC
                    connection establishment, successful
                    [REPRODUCED HEREIN AS FIG. 4]
        FIG. 5.3.13.1-3: RRC connection resume followed
                    by network release, successful
                    [REPRODUCED HEREIN AS FIG. 5]
        FIG. 5.3.13.1-4: RRC connection resume followed
                    by network suspend, successful
                    [REPRODUCED HERE AS FIG. 6]
        FIG. 5.3.13.1-5: RRC connection resume, network reject
The purpose of this procedure is to resume an RRC
connection including resuming SRB(s) and
DRB(s) or perform an RNA update.
5.3.13.2        Initiation
The UE initiates the procedure when upper layers or
AS requests resume of an RRC connection,
when responding to NG-RAN paging or upon
triggering RNA updates while the UE is in
RRC_INACTIVE.
Upon initiation of the procedure, the UE shall:
        Editor's Note: FFS Whether SCG configuration should
            be released or whether that should be
                treated as any other configuration (i.e. with delta signal-
ling).
        1 > apply L1/L2 default configurations;
        1 > apply the CCCH configuration as specified in 9.1.1.2;
        Editor's Note: FFS Whether NR supports a
            timeAlignmentTimerCommon, whether is
                transmitted in SIB2 and UE behavior associated).
        1 > start timer T319;
        1 > stop timer T380;
        1 > initiate transmission of the RRCResumeRequest
            message in accordance with 5.3.13.3;
        Editor's Note: FFS Requirements on up to date
            system information acquisiton before
                connection resumption.
        Editor's Note: FFS Details regarding default L1/L2
            configurations (e.g. CCCH, physical
                channel, MAC, scheduling, etc.) for Resume Request.
5.3.13.3        Actions related to transmission
of RRCResumeRequest message
The UE shall set the contents of RRCResumeRequest
message as follows:
        1 > set the resumeIdentity to the stored I-RNTI value;
        1 > set the resumeCause in accordance with the information
            received from upper layers or from
                AS layer;
        Editor's Note: FFS Whether more aspects related to
            resumeCause is needed to be captured (e.g. RNA
                update due to mobility, RNA periodic update, etc.).
        Editor's Note: FFS Whether any update is needed
            based on outcme of the MSG.3 size discussion..
        1 > restore the RRC configuration and security
            context from the stored UE AS context;
        1 > update the K_gNB key based on the current K_gNB
            or the NH, using the storednextHopChainingCount
                value, as specified in TS 33.501 [11];
        Editor's Note: FFS How to handle the case of Reject
        1 > derive the K_RRCenc key, the K_RRCint, the K_UPint
            key and the K_UPenc key;
        Editor's Note: FFS Working assumption TBC (NCC in
            suspend and new key in RRC Resume
                Request).
        1 > set the resumeMAC-I to the X least significant
            bits of the MAC-I calculated:
                2 > over the ASN.1 encoded as per section 8 (i.e., a
                    multiple of 8 bits) VarResumeMAC-Input;
                2 > with the K_RRCint key and the previously configured
                    integrity protection algorithm; and
                2 > with all input bits for COUNT, BEARER and
                    DIRECTION set to binary ones;
        Editor's Note: FFS Length X of the resumeMAC-I.
        Editor's Note: FFS Additional input to VarResumeMAC-Input
            (replay attacks mitigation).1 >
                restore the PDCP state and re-establish PDCP entities for
SRB1;
        1 > resume SRB1;
        1 > submit the RRCResumeRequest message to
            lower layers for transmission;
        1 > configure lower layers to resume integrity protection
            for all radio bearers except SRB0
                using the previously configured algorithm and
                the K_RRCint key and K_UPint key immediately,
                i.e., integrity protection shall be applied to all
                subsequent messages received and sent by
                the UE;
        NOTE 1: Only DRBs with previously configured
            UP integrity protection shall resume
                integrity protection.
5.3.13.4        Reception of the RRCResume by the UE
The UE shall:
        1 > stop timer T319;
        1 > restore the PDCP state, reset COUNT value and
            re-establish PDCP entities for SRB2 and
                all DRBs;
        1 > if drb-ContinueROHC is included:
            2 > indicate to lower layers that stored UE AS
                context is used and that drb-ContinueROHC
                    is configured;
            2 > continue the header compression protocol
                context for the DRBs configured with the
                    header compression protocol;
        1 > else:
            2 > indicate to lower layers that stored UE AS context is used;
            2 > reset the header compression protocol context
                for the DRBs configured with the header
                    compression protocol;
        1 > discard the stored UE AS context and I-RNTI;
        1 > if the RRCResume includes the masterCellGroup:
            2 > perform the cell group configuration for the received
                masterCellGroup according to 5.3.5.5;
        Editor's Note: FFS Whether it is supported to
            configure secondaryCellGroup at Resume.
        1 > if the RRCResume includes the radioBearerConfig:
            2 > perform the radio bearer configuration according to
5.3.5.6;
        Editor's Note: FFS Whether there needs to
            be a second radioBearerConfig.
        1 > resume SRB2 and all DRBs;
        1 > if stored, discard the cell reselection priority
            information provided by the
                cellReselectionPriorities or inherited from another RAT;
        1 > if the RRCResume message includes the measConfig:
            2 > perform the measurement configuration
                procedure as specified in 5.5.2;
        1 > resume measurements if suspended;
        Editor's Note: FFS Whether there is a need to define
        UE actions related to access control
            timers (equivalent to T302, T303, T305, T306,
                T308 in LTE). For example, informing
                upper layers if a given timer is not running.
        1 > enter RRC_CONNECTED;
        1 > indicate to upper layers that the suspended
            RRC connection has been resumed;
        Editor's Note: FFS NAS-AS interactions for RRC_INACTIVE.
        1 > stop the cell re-selection procedure;
        1 > consider the current cell to be the PCell;
        1 > set the content of the of RRCResumeCompletemessage
            as follows:
                2 > if the upper layer provides NAS PDU include
                    and set the dedicatedInfoNAS to include
                        the information received from upper layers;
        1 > submit the RRCResumeComplete message to
            lower layers for transmission;
        1 > the procedure ends.
5.3.13.5        T319 expiry or Integrity check failure
from lower layers while T319 is running
```

-continued

```
The UE shall:
   1 > if timer T319 expires or upon receiving Integrity
      check failure indication from lower layers
      while T319 is running:
      2 > perform the actions upon going to RRC_IDLE
         as specified in 5.3.11 with release cause
         RRC Resume failure;
   5.3.13.6   Cell re-selection while T319 is running
      Editor's Note: FFS Whether cell reselection actions
      need to be defined for other timers e.g.
         access control timers equivalent to T302,
         T303, T305, T306 and T308 in LTE).
The UE shall:
   1 > if cell reselection occurs while T319 is running:
      3 > stop timer T319;
      3 > reset MAC, release the MAC configuration and
         re-establish RLC for all RBs that are established;
      3 > discard the temporary security context
         (previously restored resumeMAC-I and $K_{gNB}$
         key) and the keys $K_{RRCenc}$ key, the $K_{RRCint}$,
         the $K_{UPint}$ key and the $K_{UPenc}$;
      3 > perform the RRC resume procedure
         as specified in 5.3.13;
   5.3.13.7   Reception of the RRCSetup by the UE
The UE shall:
   1 > perform the RRC connection setup procedure
      as specified in 5.3.3.4;
   5.3.13.8   Reception of the RRCReject by the UE
The UE shall:
   1 > stop timer T319;
   1 > reset MAC and release the MAC configuration;
   1 > start timer T302, with the timer value set to the waitTime;
   1 > if RRCReject is sent in response to an
      RRCResumeResquest triggered by upper layers;
      2 > inform upper layers about the failure to resume
         the RRC connection and access control
            related information, upon which the procedure ends;
   Editor's Note: FFS UE actions if RRCResumeRequest
   is not triggered by upper layers.
   Editor's Note: FFS Additional UE actions upon receiving
   RRCReject e.g. T380 handling, SRB1 suspension, etc.
   Editor's Note: FFS Which access control related information
   is informed to higher layers.
```

SUMMARY

Systems and methods are disclosed herein relating to wireless device (e.g., User Equipment (UE)) behavior after rejection of a resume request triggered by a Radio Access Network (RAN) based Notification Area Update (RNAU) or upon cell reselection during resume. In some embodiments, a method of operation of a wireless device in a cellular communications system comprises transmitting, to a RAN node, a Radio Resource Control (RRC) resume request triggered by an RNAU and receiving, from the RAN node, an RRC resume reject message comprising a wait timer value in response to the RRC resume request. The method further comprises starting a wait timer initialized with the wait timer value, and sending the RNAU when the wait timer has expired.

In some embodiments, the method further comprises monitoring for RAN paging and Core Network (CN) paging while the wait timer is running In some embodiments, the method further comprises, upon receiving a RAN paging or CN paging while the wait timer is running, responding to the RAN paging or CN paging.

In some embodiments, the RNAU is a periodic RNAU. In some other embodiments, the RNAU is due to mobility.

Embodiments of a wireless device for a cellular communications system are also disclosed. In some embodiments, a wireless device for a cellular communications system is adapted to transmit, to a RAN node, an RRC resume request triggered by an RNAU and receive, from the RAN node, an RRC resume reject message comprising a wait timer value in response to the RRC resume request. The wireless device is further adapted to start a wait timer initialized with the wait timer value and send the RNAU when the wait timer has expired.

In some embodiments, the wireless device is further adapted to monitor for RAN paging and CN paging while the wait timer is running In some embodiments, the wireless device is further adapted to, upon receiving a RAN paging or CN paging while the wait timer is running, respond to the RAN paging or CN paging.

In some embodiments, the RNAU is a periodic RNAU. In some other embodiments, the RNAU is due to mobility.

In some embodiments, a wireless device for a cellular communications system comprises radio front-end circuitry and processing circuitry associated with the radio front-end circuitry. The processing circuitry is configured to cause the wireless device to transmit, to a RAN node, an RRC resume request triggered by an RNAU and receive, from the RAN node, an RRC resume reject message comprising a wait timer value in response to the RRC resume request. The processing circuitry is further configured to cause the wireless device to start a wait timer initialized with the wait timer value and send the RNAU when the wait timer has expired.

In some embodiments, the processing circuitry is further configured to cause the wireless device to monitor for RAN paging and CN paging while the wait timer is running In some embodiments, the processing circuitry is further configured to cause the wireless device to, upon receiving a RAN paging or CN paging while the wait timer is running, respond to the RAN paging or CN paging.

In some embodiments, the RNAU is a periodic RNAU. In some other embodiments, the RNAU is due to mobility.

In some embodiments, a method of operation of a wireless device in a cellular communications system comprises transmitting, to a RAN node, an RRC resume request and receiving, from the RAN node, an RRC resume reject message comprising a wait timer value in response to the RRC resume request. The method further comprises starting a wait timer initialized with the wait timer value and performing a cell reselection to a target cell while the wait timer is running. The method further comprises, upon performing the cell reselection to the target cell while the wait timer is running, re-initiating a pending Access Stratum (AS) layer procedure in the target cell.

In some embodiments, the method further comprises determining whether an upper layer event has occurred. Re-initiating the pending AS layer procedure in the target cell comprises re-initiating the pending AS layer procedure in the target cell if an upper layer event has occurred. In some embodiments, the method further comprises discarding the pending AS layer procedure if an upper layer event has occurred. In some embodiments, the upper layer event is mobile originating data or mobile originating signaling.

In some embodiments, the pending AS layer procedure is an RNAU procedure.

In some embodiments, a wireless device for a cellular communications system is adapted to transmit, to a RAN node, an RRC resume request and receive, from the RAN node, an RRC resume reject message comprising a wait timer value in response to the RRC resume request. The wireless device is further adapted to start a wait timer initialized with the wait timer value and perform a cell reselection to a target cell while the wait timer is running. The wireless device is further adapted to, upon performing the cell reselection to the target cell while the wait timer is running, re-initiate a pending AS layer procedure in the target cell.

In some embodiments, a wireless device for a cellular communications system comprises radio front-end circuitry and processing circuitry associated with the radio front-end circuitry. The processing circuitry is configured to cause the wireless device to transmit, to a RAN node, an RRC resume request and receive, from the RAN node, an RRC resume reject message comprising a wait timer value in response to the RRC resume request. The processing circuitry is further configured to cause the wireless device to start a wait timer initialized with the wait timer value and perform a cell reselection to a target cell while the wait timer is running. The processing circuitry is further configured to cause the wireless device to, upon performing the cell reselection to the target cell while the wait timer is running, re-initiate a pending AS layer procedure in the target cell.

In some embodiments, a method of operation of a wireless device in a cellular communications system comprises transmitting, to a RAN node, an RRC resume request, starting a timer, and performing a cell reselection to a target cell while the timer is running. The method further comprises, upon performing the cell reselection to the target cell while the wait timer is running, re-initiating a pending AS layer procedure in the target cell.

In some embodiments, the timer is a timer that is started upon initiation of an RRC resume procedure during which the RRC resume request is transmitted.

In some embodiments, the method further comprises determining whether an upper layer event has occurred. Re-initiating the pending AS layer procedure in the target cell comprises re-initiating the pending AS layer procedure in the target cell if an upper layer event has occurred. In some embodiments, the method further comprises discarding the pending AS layer procedure if an upper layer event has occurred. In some embodiments, the upper layer event is mobile originating data or mobile originating signaling.

In some embodiments, the pending AS layer procedure is an RNAU procedure.

In some embodiments, a wireless device for a cellular communications system is adapted to transmit, to a RAN node, an RRC resume request, start a timer, and perform a cell reselection to a target cell while the timer is running. The wireless device is further adapted to, upon performing the cell reselection to the target cell while the wait timer is running, re-initiate a pending AS layer procedure in the target cell.

In some embodiments, a wireless device for a cellular communications system comprises radio front-end circuitry and processing circuitry associated with the radio front-end circuitry. The processing circuitry is configured to cause the wireless device to transmit, to a RAN node, an RRC resume request, start a timer, and perform a cell reselection to a target cell while the timer is running. The processing circuitry is further configured to cause the wireless device to, upon performing the cell reselection to the target cell while the wait timer is running, re-initiate a pending AS layer procedure in the target cell.

BRIEF DESCRIPTION OF THE DRAWINGS

The accompanying drawing figures incorporated in and forming a part of this specification illustrate several aspects of the disclosure, and together with the description serve to explain the principles of the disclosure.

FIGS. 17 through 20 are flow charts illustrating methods implemented in a communication system such as that of FIGS. 15 and 16.

DETAILED DESCRIPTION

Figure 1:
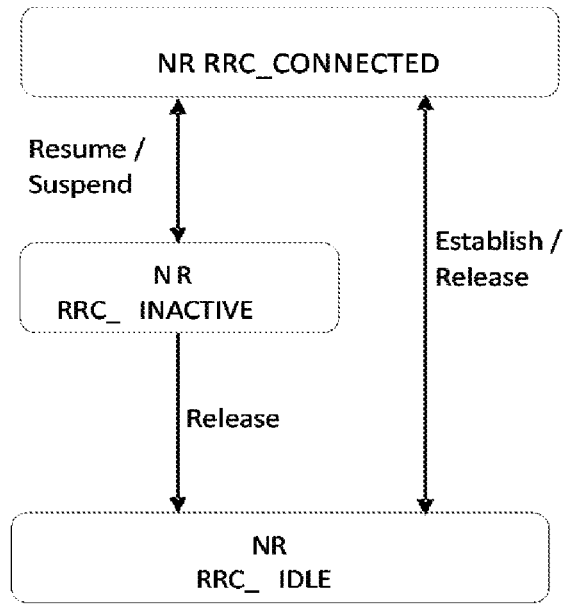
FIG. 1 is a flow diagram showing possible state transitions in Third Generation Partnership Project (3GPP) New Radio (NR)
Figure 2:
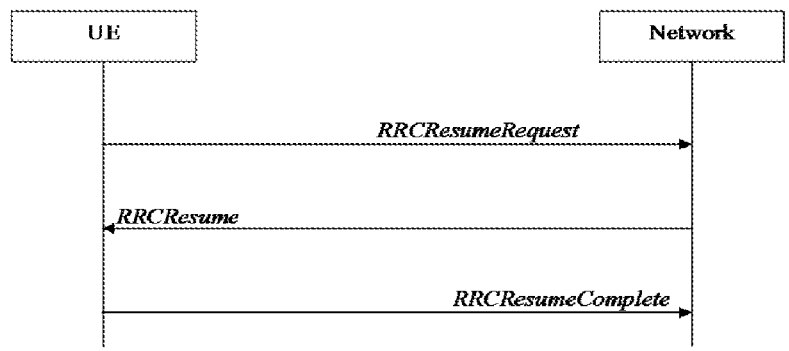
FIG. 2 an illustration of a successful Radio Resource Control (RRC) connection resume.
Figure 3:
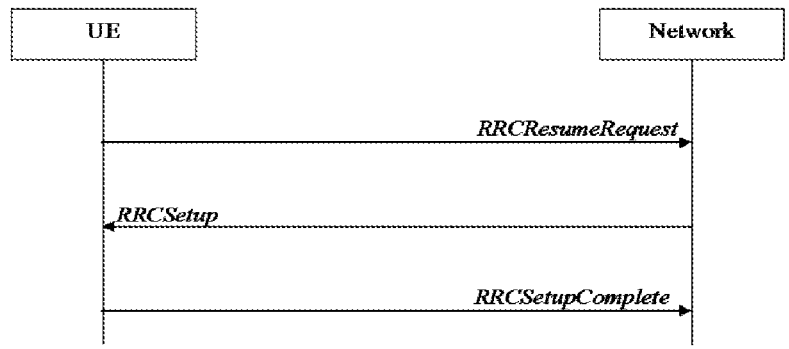
FIG. 3 is an illustration of a successful RRC connection resume fallback to RRC connection establishment.
Figure 4:
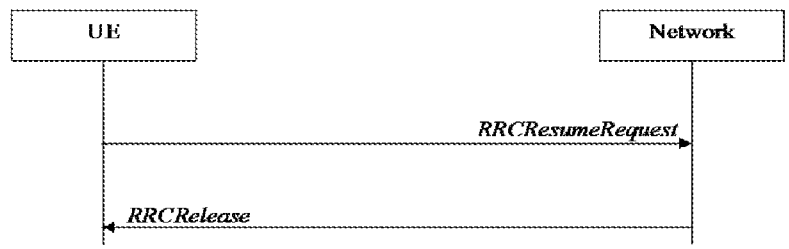
FIG. 4 is an illustration of a successful RRC connection resume followed by network release.
Figure 5:
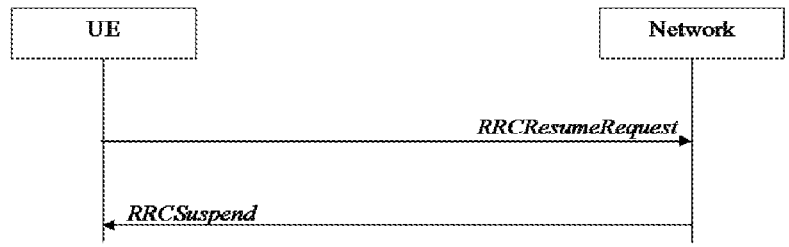
FIG. 5 is an illustration of a successful RRC connection resume followed by network suspend.
Figure 6:
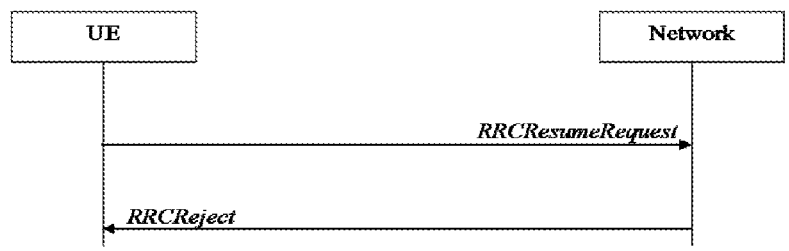
FIG. 6 is an illustration of a network rejected RRC connection resume.

The embodiments set forth below represent information to enable those skilled in the art to practice the embodiments and illustrate the best mode of practicing the embodiments.

Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

There currently exist certain challenge(s) with respect to Radio Resource Control (RRC) Resume, particularly in Third Generation Partnership Project (3GPP) New Radio (NR), but possibly also in other types of networks such as 3GPP Long Term Evolution (LTE) networks implementing Release 15 or later releases of the LTE specifications. As described above, there are a number of events that could occur leading to a failure of the Resume procedure. In particular the following cases could occur:

1. A User Equipment (UE) performs a cell reselection prior to receiving a Resume message (while timer T319 is running); and
2. A UE receives a reject message and starts a wait timer T302.

For case 1, it is currently stated that the UE is to perform another RRC Resume procedure in the target cell. The problem with this is that there could be cases when the conditions for resume are different in the target cell, in which case re-initiating the resume procedure in those cases would not work. Example cases include:

The UE entering a new Tracking Area (TA) that is not on the TA list the UE currently has been configured with. In this case, the RRC resume procedure may fail, since the UE needs to instead perform Non-Access Stratum (NAS) signaling to update the TA list.

The UE entering a cell which it is forbidden to access by NAS layer (e.g., forbidden TA). In this case, the RRC resume could also fail or lead to other issues.

For case 2, it is currently stated that the UE should notify higher layers in case the resume was triggered by higher layers; however, what the UE should do if the resume was triggered by RRC (Access Stratum (AS)) layer is not defined. One particular problem that needs to be addressed here is what happens when the UE performs cell reselection.

Certain aspects of the present disclosure and their embodiments may provide solutions to these or other challenges. Aspects disclosed herein introduce a new mechanism in the UE to handle the case in which it has failed with the Resume in one cell and re-selects to another cell. The solution covers both the case when cell reselection occurs while timer T319 is running, and when cell reselection occurs after the UE has received a Reject message and timer T302 is running.

In case the initial Resume was triggered by the AS layer (RRC), the UE will first check if any NAS layer event has occurred as a result of the cell reselection or during the time leading up to the cell reselection.

1. If an upper layer event has occurred, the UE will discard any pending AS level Resume (e.g., Radio Access Network (RAN) based Notification Area Update (RNAU)) and trigger a new AS level resume based on the trigger for upper layer.
2. If an upper layer event has not occurred, the UE will re-initiate the AS level Resume in the target cell.

Possible upper layer events could include:
arrival of Uplink (UL) data,
arrival of NAS signaling (e.g., a UE NAS re-registration due to mobility), or
UE responding to Core Network (CN) or RAN paging.

In case the initial Resume was triggered by the upper layer, the UE will, upon cell reselection, inform the upper layer that it failed to resume the connection. This will trigger the upper layer to re-trigger the resume leading to similar behavior as case 2 above.

Certain embodiments may provide one or more of the following technical advantage(s). By using the proposed solution, it is possible to ensure that NAS or upper layer mechanisms always take precedence over AS initiated resume. This will avoid error cases such as:

UE performing a resume in an area it is not allowed to access;

UE performing an AS resume (e.g., RNAU) in an area which is outside the UE CN Registration area.

Avoiding these error cases is beneficial since it will avoid service interruption and avoid unauthorized access to network resources.

Aspects disclosed herein are generally described as actions performed by an RRC_INACTIVE UE in NR. It should be understood that the present disclosure is also applicable to additional cases, such as:

All previous cases where procedures occur in LTE instead of NR—that is for the case of LTE RRC_INACTIVE UEs;

Inter-Radio Access Technology (RAT) procedures in RRC_INACTIVE, for example, between LTE and NR connected to the same CN (5G Core Network).

Now, a more detailed description of some particular embodiments of the present disclosure are provided.

1 UE Behavior when Receiving an RRC Resume Reject

It has been previously agreed in 3GPP that, upon sending an RRC Resume Request, the UE may receive an RRC Reject with a wait timer and remain in RRC_INACTIVE.

After receiving an RRC Reject, the UE needs to contact the network, via Resume, upon the expiry of the wait timer and upon cell reselection while the wait timer is running In the latest version of the TP on connection control that is reflected by the following. For Future Study (FFS) items related to the reception of RRC Reject.

Editor's Note: FFS How to handle the case of Reject.

Editor's Note: FFS Additional UE actions upon receiving RRC Reject, e.g. T380 handling, SRB1 suspension, etc.

This description addresses these and other FFS items. For instance, actions are proposed upon cell reselection while the wait timer is running and the action upon the expiry of the wait timer for the different cases (e.g., mobility RNAU, periodic RNAU, UL data, tracking area updates, etc.).

In current TP on connection control in NR, the following is currently captured concerning the reception of an RRC Reject message:

---

5.3.13.8  Reception of the RRCReject by the UE

The UE shall:
1 > stop timer T319;
1 > reset MAC and release the MAC configuration;
1 > start timer T302, with the timer value set to the waitTime;
1 > if RRCReject is sent in response to an RRCResumeResquest triggered by upper layers;
   2 > inform upper layers about the failure to resume the RRC connection and access control related information, upon which the procedure ends;

---

As in LTE, the current version of the Text Proposal ("TP") on connection control assumes that at least the case of UL data and Registration Area updates are modelled as a higher layer request to RRC. Then, as shown above, upon receiving an RRCReject in response to an RRCResumeRequest triggered by upper layers (UL data or Registration Area Update), the UE informs upper layers about the failure to resume the RRC connection so that higher layers can make the procedure pending until the wait timer expires or cell reselection is performed. The handling of the wait timer T302 is then handled by AS and, upon expiry, AS notifies the higher layers that can again trigger an RRC Resume Request.

By informing the upper layer that the UE has been rejected, the upper layers can re-initiate the Resume when the wait timer T302 has expired. In this case, there does not need to be any pending RRC Resume Request.

In NR, in addition to this case where resume is requested by higher layer, a Resume request can also be requested by AS layer in the following cases:
  resume is triggered by a periodic RNAU is Rejected with wait time, and
  resume is triggered by mobility RNAU is Rejected with wait time.

1.1 Periodic RNAUs

Periodic RNAUs are triggered upon the expiry of the periodic RNAU timer (T380), whose value can be provided in the RRC Release message with suspend configuration. The network expects periodic RNAUs in order for the network to know whether to clean up the UE context at the network side in case the UE is gone. However, as RRC Reject is transmitted on SRB0, the UE cannot be certain that the network has been notified or not, as a given node can send a Reject without fetching and/or updating the UE context. Hence, one solution is to consider the periodic RNAU pending and send it when the wait timer expires. This could possibly delay the network to clean up the UE context in case the UE has gone, instead of being rejected by another node. However, considering that the wait timer values are short (less than a minute), it is not very problematic for the network to wait longer for a periodic RNAU; and, even if it does not, the network context will be synchronized anyway once the UE performs the RNAU.

1.2 Mobility RNAUs

Mobility RNAUs are triggered when the UE enters a new cell not belonging to its configured RAN-based Notification Area (RNA). The network should be informed about that event so that the network knows the cells in which it should efficiently page the UE. However, if the UE enters a new RNA and tries to perform an RNA update and if the network rejects the request with a wait timer, while the wait timer is running, the UE most likely will not be reached via RAN paging. However, overall this will be a very rare case, and the network should try to prioritize the RNA updates. If the UE also continues to listen to RAN paging, it may be possible for a RAN node which fails to page the UE in the RNA to page in surrounding areas. The UE will also listen to CN paging.

1.3 Summary

To summarize aspects of Sections 1.1 and 1.2 above:
  Upon receiving an RRC Reject with wait time in response to an RRC Resume Request triggered by an RNAU (periodic or mobility), the UE starts the wait timer.
  Upon the expiry of the wait timer (in the same cell) after receiving the RRC Reject with the wait time in response to the RRC Resume Request triggered by the RNAU (periodic or mobility), the UE sends the pending RNAU.
  During the wait period, the UE should continue to monitor RAN and CN paging and respond if it is paged.

Figure 7:
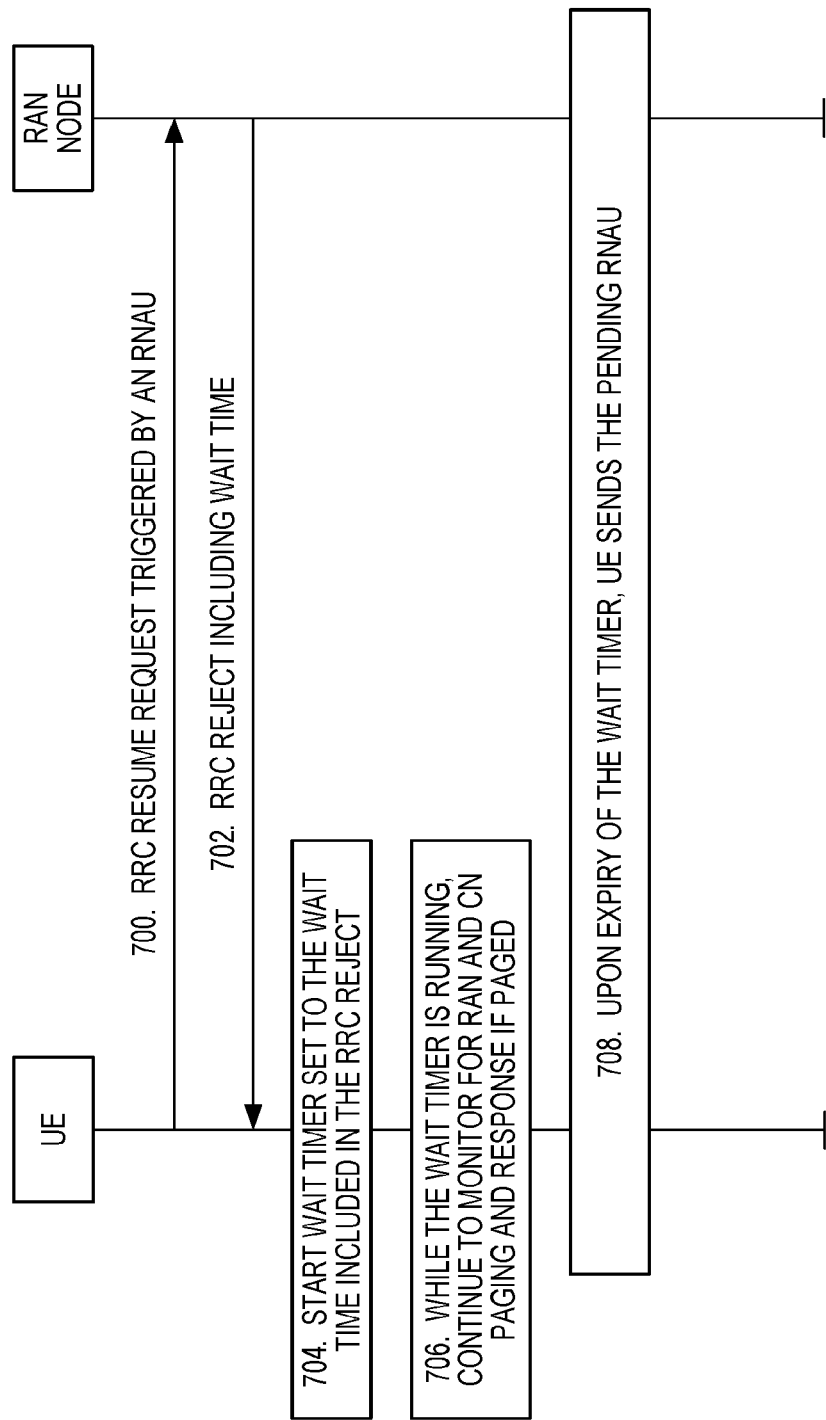
FIG. 7 illustrates the operation of a User Equipment (UE) and a Radio Access Network (RAN) node (e.g., a base station) in which the UE considers a RAN-based Notification Area Update (RNAU) that triggered a network rejected RRC connection resume as pending until a wait timer has expired and sends the pending RNAU when the wait timer has expired in accordance with some embodiments of the present disclosure.

FIG. 7 illustrates the operation of a UE and a RAN node (e.g., a base station such as, e.g., a NR base station (gNB)) in accordance with at least some of the aspects of the embodiments described above. As illustrated, a UE transmits an RRC Resume Request triggered by an RNAU (periodic or mobility) (step 700). The RAN node receives the RRC Resume Request and, in response, transmits an RRC Reject with a wait time to the UE (step 702). Upon receiving the RRC Reject message with the wait time, the UE starts a wait timer that is set to the wait time included in the RRC Reject (step 704). While the wait timer is running, the UE considers the RNAU as pending. In some embodiments, while the wait timer is running (i.e., during the wait period), the UE continues to monitor for RAN and CN paging and responds if paged (step 706). When the wait timer expires, the UE sends the pending RNAU to the RAN node (step 708). In other words, the UE again attempts an RRC Connection Resume triggered by the pending RNAU and, assuming that the RRC Connection Resume is successful, the UE sends the RNAU to the network.

2 UE Behavior Upon Cell Reselection while T302 (Wait Time) is Running

In LTE, the wait timer is provided to the UE in RRC Reject as a way to avoid a subsequent attempt in case a cell is overloaded. Hence, upon cell reselection, the wait timer is stopped, and the UE should be able to access it again if the cell is not barred for other reasons.

In LTE, resume requests are modelled as a request from a higher layer to the AS layer. Upon receiving an RRC Reject with wait time in response to an RRC Resume Request, the UE informs the higher layers and starts the wait timer. Higher layers are informed about the barring alleviation either when the wait timer expires or when cell reselection occurs. Then, the higher layer can again trigger any pending Resume Request to the AS.

For NR, it is proposed to apply the same behavior for any resume request triggered by an upper layer (e.g., mo-data, mo-signaling). Only the upper layers know if the upper layer procedure should continue after the cell reselection or not (e.g., the UE may be barred to access a target cell on NAS level). Thus, this means that, upon cell reselection while the wait timer is running, after receiving an RRC Reject with wait time in response to an RRC Resume Request triggered by upper layer, the RAN layer informs the upper layer that barring is alleviated.

2.1 Mobility or Periodic RNAUs

For a resume request triggered by AS layer (e.g., RNAU), it is the responsibility of the AS layer to handle the case of cell reselection while the wait time is running. This means that if no upper layer procedure has been triggered (e.g., due to the cell reselection or during the wait time), the AS layer should consider the AS layer procedure pending and should re-initiate after the cell reselection. This means that, upon cell reselection while the wait timer is running, the UE re-initiates any pending AS layer procedure (e.g., RNAU) in the new cell assuming no upper layer event has occurred (e.g., mo-data, mo-signaling).

In case some upper layer event has occurred, it is proposed that, upon cell reselection while the wait timer is running, the UE discards any pending AS layer procedure (e.g., RNAU) if an upper layer event has occurred (e.g., mo-data, mo-signaling).

Figure 8:
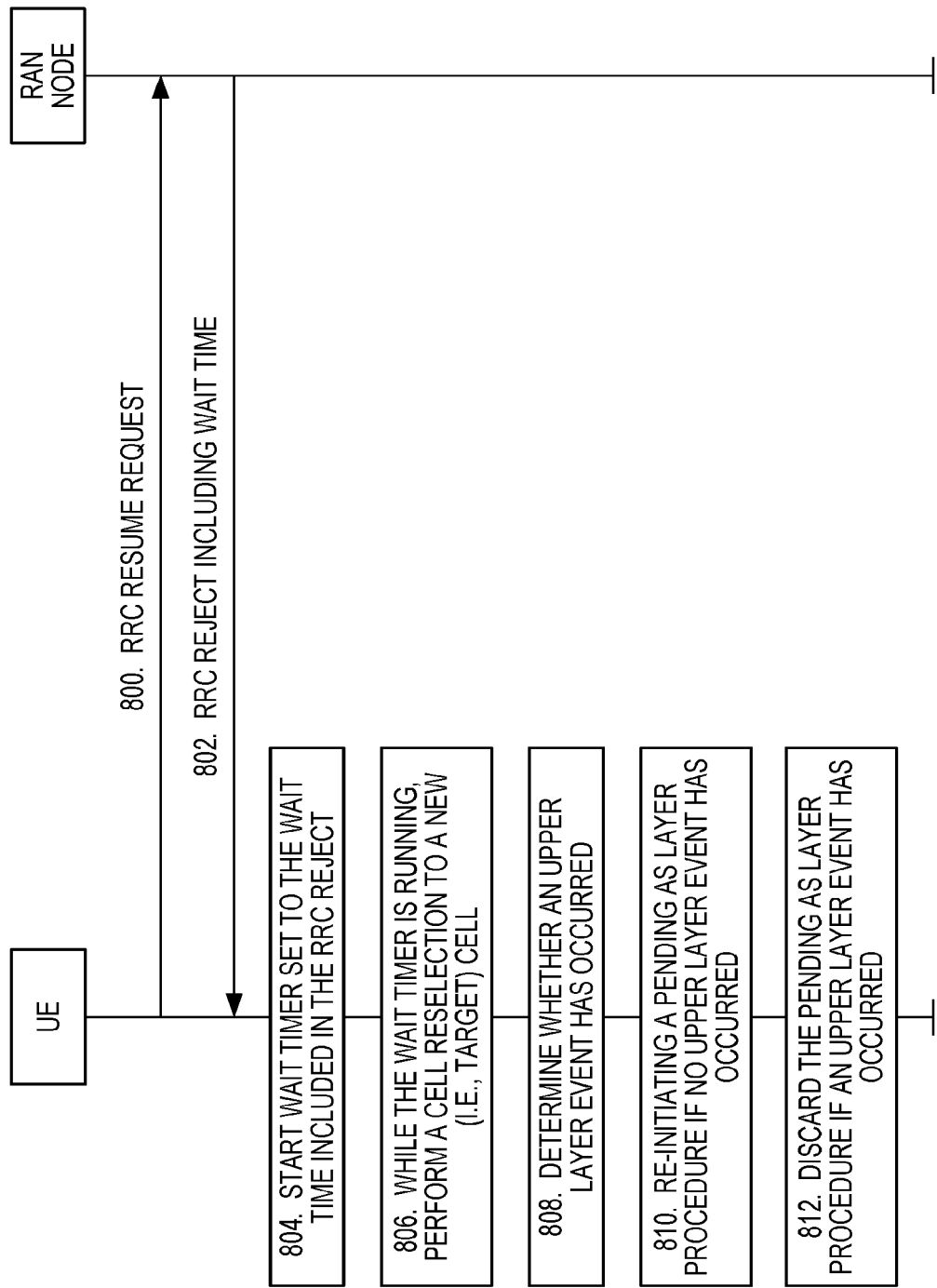
FIG. 8 illustrates the operation of a UE and a RAN node (e.g., a base station) in which the UE performs cell reselection during a wait period after receiving an RRC Reject in response to an RRC Resume Request and may re-initiate a suspending Access Stratum (AS) procedure in the new cell in accordance with some embodiments of the present disclosure.

FIG. 8 illustrates the operation of a UE and a RAN node (e.g., a base station such as, e.g., a gNB) in accordance with at least some of the aspects of the embodiments described above. As illustrated, a UE transmits an RRC Resume Request (step 800). The RAN node receives the RRC Resume Request and, in response, transmits an RRC Reject with a wait time to the UE (step 802). Upon receiving the RRC Reject message with the wait time, the UE starts a wait timer that is set to the wait time included in the RRC Reject (step 804). While the wait timer is running, the UE performs a cell reselection to a new (i.e., target) cell (step 806). Upon performing the cell reselection to the new cell while the wait timer is running, the UE may re-initiate a pending AS layer procedure (e.g., RNAU) in the new cell. More specifically, in some embodiments, the UE determines whether an upper layer event has occurred (e.g., mo-data, mo-signaling) (step 808). The UE re-initiates the pending AS layer procedure in the new cell if no upper layer event has occurred (e.g., mo-data, mo-signaling) (step 810). Conversely, if an upper layer event has occurred, the UE discards the pending AS layer procedure (812).

3 UE Behavior when Preforming a Cell Reselection while T319 is Running (Prior to UE Receiving any Response Message to the Resume)

Currently the following UE behavior is defined in case of cell reselection while T319 is running:

---

5.3.13.6  Cell re-selection while T319 is running

Editor's Note: FFS Whether cell reselection actions need to be defined for other timers e.g. access control timers equivalent to T302, T303, T305, T306 and T308 in LTE).
The UE shall:
1 > if cell reselection occurs while T319 is running:
  3 > stop timer T319;
  3 > reset MAC, release the MAC configuration and re-establish RLC for all RBs that are established;
  3 > discard the temporary security context (previously restored resumeMAC-I and $K_{gNB}$ key) and the keys $K_{RRCenc}$ key, the $K_{RRCint}$, the $K_{UPint}$ key and the $K_{UPenc}$;
  3 > perform the RRC resume procedure as specified in 5.3.13;

---

The problem with this behavior is that it is not considered that the Resume could be triggered by a NAS or upper layer or by the cell reselection. Instead the following behavior is proposed.

In case the resume was triggered by upper layer, the AS layer in the UE, upon cell reselection while T319 is running, informs the upper layer that the resume failed. Optionally, the UE could provide the upper layer with a reason why the resume failed (e.g., Cell Reselection). In this way, the upper layer could re-initiate the Resume procedure in the target cell. It is possible the upper layer will change during this process. For example, if the upper layer procedure was initial Mobile Originated data, it could change to Mobile Originated signaling (UE CN registration area update) if the target cell does not belong to the current UE CN registration area. It could also happen that the NAS layer chooses to not re-initiate the resume in the target cell; for example, if the UE is not allowed to access the target cell (e.g., Area Forbidden has been configured on NAS level).

In case the resume was triggered by the AS level (e.g., RNAU), the following UE behavior is proposed. If no upper layer procedure has been triggered (e.g., due to the cell reselection or during the cell reselection), the AS layer considers the AS layer procedure pending and should re-initiate after the cell reselection. This means that, upon cell reselection while T319 is running, the UE re-initiates any pending AS layer procedure (e.g., RNAU) in the new cell assuming no upper layer event has occurred (e.g., mo-data, mo-signaling). In case some upper layer event has occurred, it is proposed that, upon cell reselection while T319 is running, the UE discards any pending AS layer procedure (e.g., RNAU) if an upper layer event has occurred (e.g., mo-data, mo-signaling).

Figure 9:
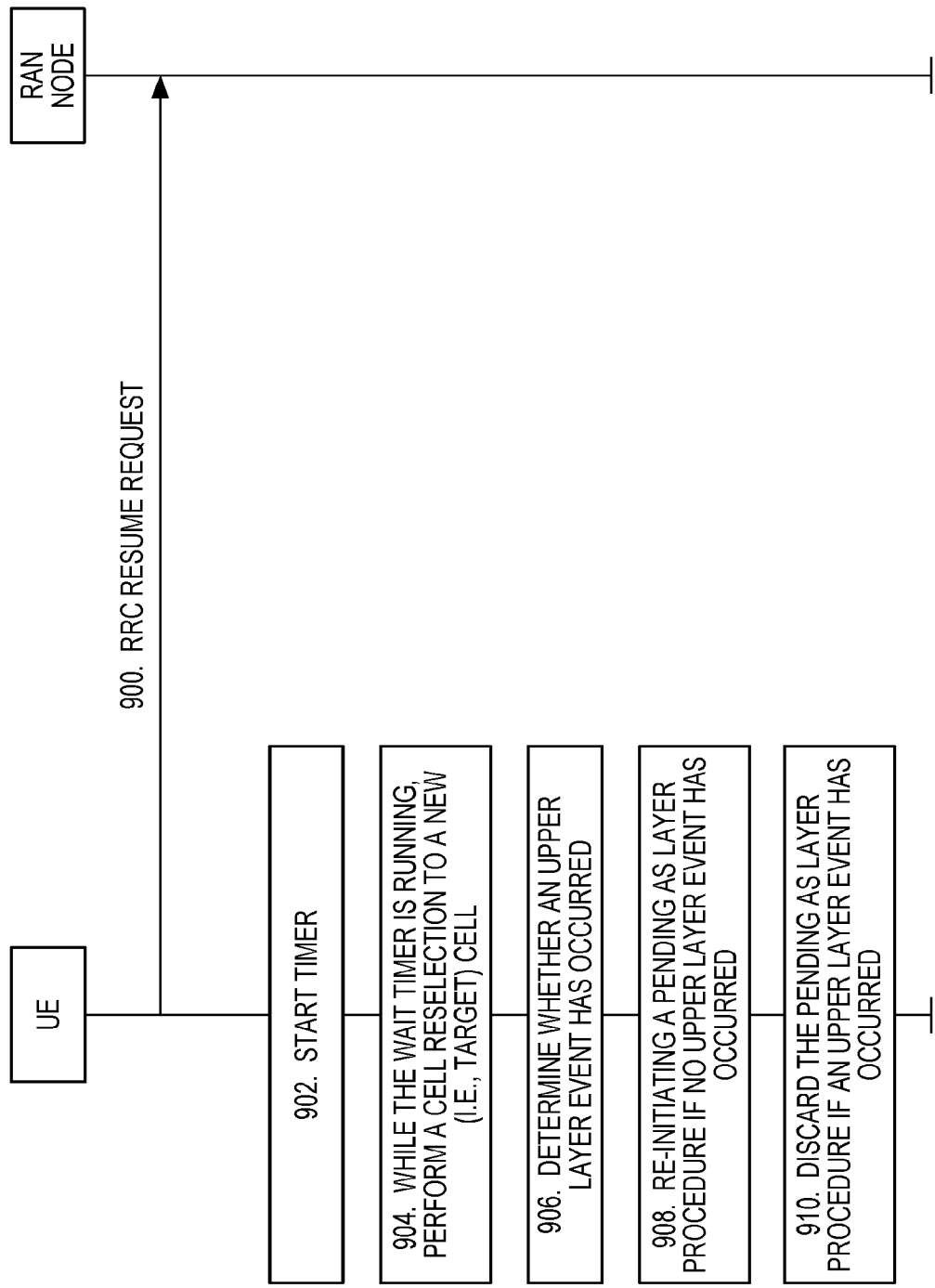
FIG. 9 illustrates the operation of a UE and a RAN node (e.g., a base station) in which the UE performs cell reselection after transmitting an RRC Resume Request triggered by an AS layer but before a response is received from the network and may re-initiate an AS procedure in the new cell in accordance with some embodiments of the present disclosure.

FIG. 9 illustrates the operation of a UE and a RAN node (e.g., a base station such as, e.g., a gNB) in accordance with at least some of the aspects of the embodiments described above. As illustrated, a UE transmits an RRC Resume Request (step 900) and starts a timer (e.g., timer T319) (step 902). In this example, the RRC Resume Request is triggered by the AS level (e.g., by an AS level procedure such as the RNAU procedure). The timer T319 is a timer that is started upon initiation of the RRC Connection Resume procedure. While the timer is running, the UE performs a cell reselection to a new cell (i.e., a target cell) (step 904). In other words, before receiving a response (e.g., an RRC Resume or an RRC Reject) from the RAN node, the UE performs the cell reselection to the new cell. Upon performing the cell reselection while the timer is running, the UE may re-initiate a pending AS layer procedure (e.g., RNAU) in the new cell. More specifically, in some embodiments, the UE determines whether an upper layer event has occurred (e.g., mo-data, mo-signaling) (step 906). The UE re-initiates the pending AS layer procedure in the new cell if no upper layer event has occurred (e.g., mo-data, mo-signaling) (step 908). Conversely, if an upper layer event has occurred, the UE discards the pending AS layer procedure (910).

Figure 10:
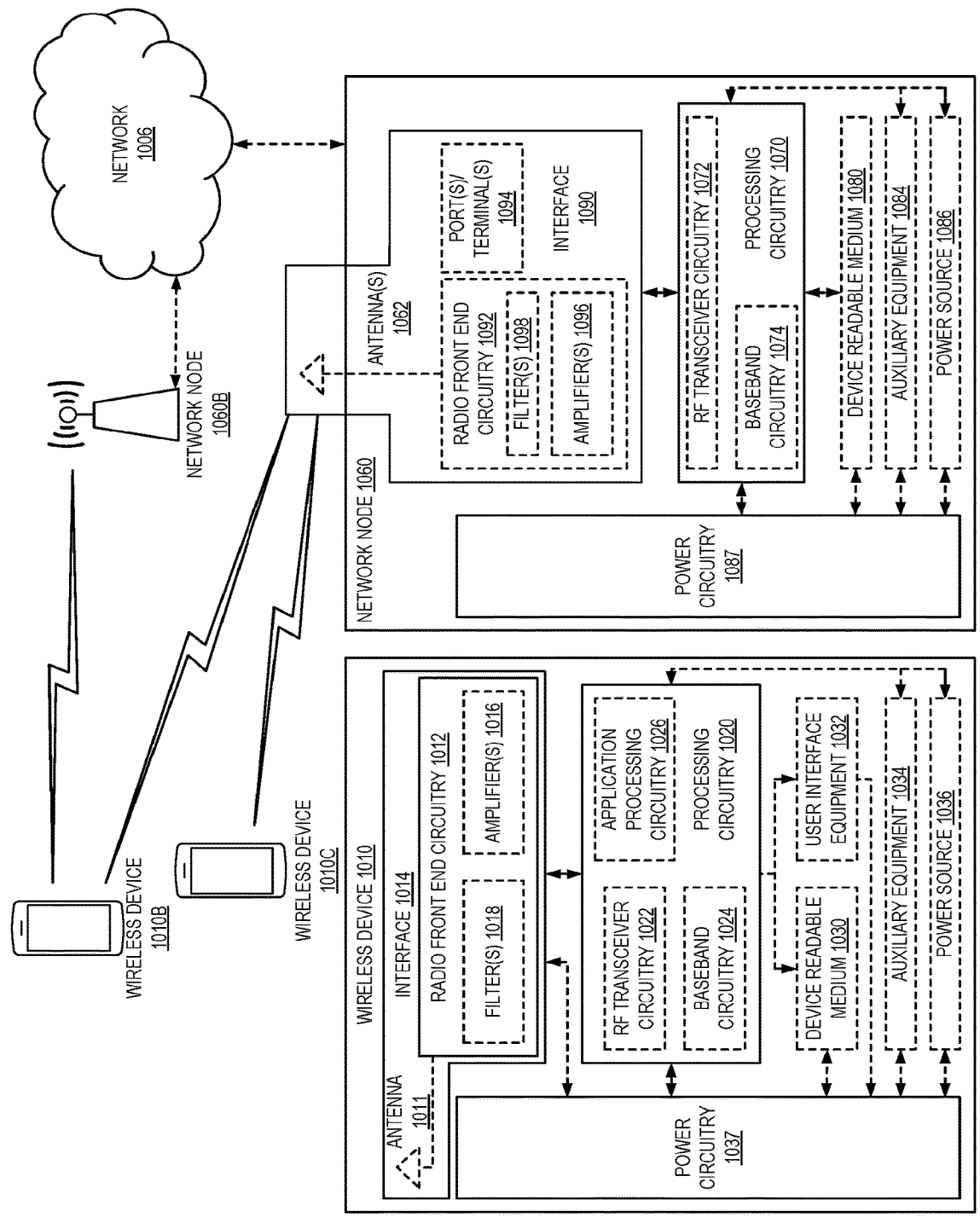
FIG. 10 illustrates an example of a wireless network in which embodiments of the present disclosure may be implemented.

Although the subject matter described herein may be implemented in any appropriate type of system using any suitable components, the embodiments disclosed herein are described in relation to a wireless network, such as the example wireless network illustrated in FIG. 10. For simplicity, the wireless network of FIG. 10 only depicts a network 1006, network nodes 1060 and 1060B, and Wireless Devices (WDs) 1010, 1010B, and 1010C. In practice, a wireless network may further include any additional elements suitable to support communication between wireless devices or between a wireless device and another communication device, such as a landline telephone, a service provider, or any other network node or end device. Of the illustrated components, the network node 1060 and the WD 1010 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), LTE, and/or other suitable Second, Third, Fourth, or Fifth Generation (2G, 3G, 4G, or 5G) standards; Wireless Local Area Network (WLAN) standards, such as the IEEE 802.11 standards; and/or any other appropriate wireless communication standard, such as the Worldwide Interoperability for Microwave Access (WiMax), Bluetooth, Z-Wave, and/or ZigBee standards.

The network 1006 may comprise one or more backhaul networks, core networks, Internet Protocol (IP) networks, Public Switched Telephone Networks (PSTNs), packet data networks, optical networks, Wide Area Networks (WANs), Local Area Networks (LANs), WLANs, wired networks, wireless networks, metropolitan area networks, and other networks to enable communication between devices.

The network node 1060 and the WD 1010 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged, and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, Access Points (APs) (e.g., radio APs), Base Stations (BSs) (e.g., radio base stations, Node Bs, enhanced or evolved Node Bs (eNBs), and gNBs). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or Remote Radio Units (RRUs), sometimes referred to as Remote Radio Heads (RRHs). Such RRUs may or may not be integrated with an antenna as an antenna integrated radio. Parts of a distributed radio base station may also be referred to as nodes in a Distributed Antenna System (DAS). Yet further examples of network nodes include Multi-Standard Radio (MSR) equipment such as MSR BSs, network controllers such as Radio Network Controllers (RNCs) or BS Controllers (BSCs), Base Transceiver Stations (BTSs), transmission points, transmission nodes, Multi-Cell/Multicast Coordination Entities (MCEs), core network nodes (e.g., Mobile Switching Centers (MSCs), Mobility Management Entities (MMEs)), Operation and Maintenance (O&M) nodes, Operations Support System (OSS) nodes, Self-Organizing Network (SON) nodes, positioning nodes (e.g., Evolved Serving Mobile Location Center (E-SMLCs)), and/or Minimization of Drive Tests (MDTs). As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 10, the network node 1060 includes processing circuitry 1070, a device readable medium 1080, an interface 1090, auxiliary equipment 1084, a power source 1086, power circuitry 1087, and an antenna 1062. Although the network node 1060 illustrated in the example wireless network of FIG. 10 may represent a device that includes the illustrated combination of hardware components, other embodiments may comprise network nodes with different combinations of components. It is to be understood that a network node comprises any suitable combination of hardware and/or software needed to perform the tasks, features, functions, and methods disclosed herein. Moreover, while the components of the network node 1060 are depicted as single boxes located within a larger box, or nested within multiple boxes, in practice, a network node may comprise multiple different physical components that make up a single illustrated component (e.g., the device readable medium 1080 may comprise multiple separate hard drives as well as multiple Random Access Memory (RAM) modules).

Similarly, the network node 1060 may be composed of multiple physically separate components (e.g., a Node B component and a RNC component, or a BTS component and a BSC component, etc.), which may each have their own respective components. In certain scenarios in which the network node 1060 comprises multiple separate components (e.g., BTS and BSC components), one or more of the separate components may be shared among several network nodes. For example, a single RNC may control multiple Node Bs. In such a scenario, each unique Node B and RNC pair may in some instances be considered a single separate network node. In some embodiments, the network node 1060 may be configured to support multiple RATs. In such embodiments, some components may be duplicated (e.g., a separate device readable medium 1080 for the different RATs) and some components may be reused (e.g., the same antenna 1062 may be shared by the RATs). The network node 1060 may also include multiple sets of the various illustrated components for different wireless technologies integrated into the network node 1060, such as, for example, GSM, Wideband Code Division Multiple Access (WCDMA), LTE, NR, WiFi, or Bluetooth wireless technologies. These wireless technologies may be integrated into the same or a different chip or set of chips and other components within the network node 1060.

The processing circuitry 1070 is configured to perform any determining, calculating, or similar operations (e.g., certain obtaining operations) described herein as being provided by a network node. These operations performed by the processing circuitry 1070 may include processing information obtained by the processing circuitry 1070 by, for example, converting the obtained information into other information, comparing the obtained information or converted information to information stored in the network node, and/or performing one or more operations based on the obtained information or converted information, and as a result of said processing making a determination.

The processing circuitry 1070 may comprise a combination of one or more of a microprocessor, a controller, a microcontroller, a Central Processing Unit (CPU), a Digital Signal Processor (DSP), an Application Specific Integrated Circuit (ASIC), a Field Programmable Gate Array (FPGA), or any other suitable computing device, resource, or combination of hardware, software, and/or encoded logic operable to provide, either alone or in conjunction with other network node 1060 components, such as the device readable medium 1080, network node 1060 functionality. For example, the processing circuitry 1070 may execute instructions stored in the device readable medium 1080 or in memory within the processing circuitry 1070. Such functionality may include providing any of the various wireless features, functions, or benefits discussed herein. In some embodiments, the processing circuitry 1070 may include a System on a Chip (SOC).

In some embodiments, the processing circuitry 1070 may include one or more of Radio Frequency (RF) transceiver circuitry 1072 and baseband processing circuitry 1074. In some embodiments, the RF transceiver circuitry 1072 and the baseband processing circuitry 1074 may be on separate chips (or sets of chips), boards, or units, such as radio units and digital units. In alternative embodiments, part or all of the RF transceiver circuitry 1072 and the baseband processing circuitry 1074 may be on the same chip or set of chips, boards, or units.

In certain embodiments, some or all of the functionality described herein as being provided by a network node, base station, eNB, or other such network device may be performed by the processing circuitry 1070 executing instructions stored on the device readable medium 1080 or memory within the processing circuitry 1070. In alternative embodiments, some or all of the functionality may be provided by the processing circuitry 1070 without executing instructions stored on a separate or discrete device readable medium, such as in a hard-wired manner In any of those embodiments, whether executing instructions stored on a device readable storage medium or not, the processing circuitry 1070 can be configured to perform the described functionality. The benefits provided by such functionality are not limited to the processing circuitry 1070 alone or to other components of the network node 1060, but are enjoyed by the network node 1060 as a whole, and/or by end users and the wireless network generally.

The device readable medium 1080 may comprise any form of volatile or non-volatile computer readable memory including, without limitation, persistent storage, solid state memory, remotely mounted memory, magnetic media, optical media, RAM, Read Only Memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by the processing circuitry 1070. The device readable medium 1080 may store any suitable instructions; data or information, including a computer program; software; an application including one or more of logic, rules, code, tables, etc.; and/or other instructions capable of being executed by the processing circuitry 1070 and utilized by the network node 1060. The device readable medium 1080 may be used to store any calculations made by the processing circuitry 1070 and/or any data received via the interface 1090. In some embodiments, the processing circuitry 1070 and the device readable medium 1080 may be considered to be integrated.

The interface 1090 is used in the wired or wireless communication of signaling and/or data between the network node 1060, a network 1006, and/or WDs 1010. As illustrated, the interface 1090 comprises port(s)/terminal(s) 1094 to send and receive data, for example to and from the network 1006 over a wired connection. The interface 1090 also includes radio front end circuitry 1092 that may be coupled to, or in certain embodiments a part of, the antenna 1062. The radio front end circuitry 1092 comprises filters 1098 and amplifiers 1096. The radio front end circuitry 1092 may be connected to the antenna 1062 and the processing circuitry 1070. The radio front end circuitry 1092 may be configured to condition signals communicated between the antenna 1062 and the processing circuitry 1070. The radio front end circuitry 1092 may receive digital data that is to be sent out to other network nodes or WDs via a wireless connection. The radio front end circuitry 1092 may convert the digital data into a radio signal having the appropriate channel and bandwidth parameters using a combination of the filters 1098 and/or the amplifiers 1096. The radio signal may then be transmitted via the antenna 1062. Similarly, when receiving data, the antenna 1062 may collect radio signals which are then converted into digital data by the radio front end circuitry 1092. The digital data may be passed to the processing circuitry 1070. In other embodiments, the interface 1090 may comprise different components and/or different combinations of components.

In certain alternative embodiments, the network node 1060 may not include separate radio front end circuitry 1092; instead, the processing circuitry 1070 may comprise radio front end circuitry and may be connected to the antenna 1062 without separate radio front end circuitry 1092. Similarly, in some embodiments, all or some of the RF transceiver circuitry 1072 may be considered a part of the interface 1090. In still other embodiments, the interface 1090 may include the one or more ports or terminals 1094, the radio front end circuitry 1092, and the RF transceiver circuitry 1072 as part of a radio unit (not shown), and the interface 1090 may communicate with the baseband processing circuitry 1074, which is part of a digital unit (not shown).

The antenna 1062 may include one or more antennas, or antenna arrays, configured to send and/or receive wireless signals. The antenna 1062 may be coupled to the radio front end circuitry 1092 and may be any type of antenna capable of transmitting and receiving data and/or signals wirelessly. In some embodiments, the antenna 1062 may comprise one or more omni-directional, sector, or panel antennas operable to transmit/receive radio signals between, for example, 2 gigahertz (GHz) and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as Multiple Input Multiple Output (MIMO). In certain embodiments, the antenna 1062 may be separate from the network node 1060 and may be connectable to the network node 1060 through an interface or port.

The antenna 1062, the interface 1090, and/or the processing circuitry 1070 may be configured to perform any receiving operations and/or certain obtaining operations described herein as being performed by a network node. Any information, data, and/or signals may be received from a WD, another network node, and/or any other network equipment. Similarly, the antenna 1062, the interface 1090, and/or the processing circuitry 1070 may be configured to perform any transmitting operations described herein as being performed by a network node. Any information, data, and/or signals may be transmitted to a WD, another network node, and/or any other network equipment.

The power circuitry 1087 may comprise, or be coupled to, power management circuitry and is configured to supply the components of the network node 1060 with power for performing the functionality described herein. The power circuitry 1087 may receive power from the power source 1086. The power source 1086 and/or the power circuitry 1087 may be configured to provide power to the various components of the network node 1060 in a form suitable for the respective components (e.g., at a voltage and current level needed for each respective component). The power source 1086 may either be included in, or be external to, the power circuitry 1087 and/or the network node 1060. For example, the network node 1060 may be connectable to an external power source (e.g., an electricity outlet) via an input circuitry or interface such as an electrical cable, whereby the external power source supplies power to the power circuitry 1087. As a further example, the power source 1086 may comprise a source of power in the form of a battery or battery pack which is connected to, or integrated in, the power circuitry 1087. The battery may provide backup power should the external power source fail. Other types of power sources, such as photovoltaic devices, may also be used.

Alternative embodiments of the network node 1060 may include additional components beyond those shown in FIG. 10 that may be responsible for providing certain aspects of the network node's functionality, including any of the functionality described herein and/or any functionality necessary to support the subject matter described herein. For example, the network node 1060 may include user interface equipment to allow input of information into the network node 1060 and to allow output of information from the network node 1060. This may allow a user to perform diagnostic, maintenance, repair, and other administrative functions for the network node 1060.

As used herein, WD refers to a device capable, configured, arranged, and/or operable to communicate wirelessly with network nodes and/or other WDs. Unless otherwise noted, the term WD may be used interchangeably herein with UE. Communicating wirelessly may involve transmitting and/or receiving wireless signals using electromagnetic waves, radio waves, infrared waves, and/or other types of signals suitable for conveying information through air. In some embodiments, a WD may be configured to transmit and/or receive information without direct human interaction. For instance, a WD may be designed to transmit information to a network on a predetermined schedule, when triggered by an internal or external event, or in response to requests from the network. Examples of a WD include, but are not limited to, a smart phone, a mobile phone, a cell phone, a Voice over IP (VoIP) phone, a wireless local loop phone, a desktop computer, a Personal Digital Assistant (PDA), a wireless camera, a gaming console or device, a music storage device, a playback appliance, a wearable terminal device, a wireless endpoint, a mobile station, a tablet, a laptop, Laptop Embedded Equipment (LEE), Laptop Mounted Equipment (LME), a smart device, a wireless Customer Premise Equipment (CPE), a vehicle mounted wireless terminal device, etc. A WD may support Device-to-Device (D2D) communication, for example by implementing a 3GPP standard for sidelink communication, Vehicle-to-Vehicle (V2V), Vehicle-to-Infrastructure (V2I), Vehicle-to-Everything (V2X), and may in this case be referred to as a D2D communication device. As yet another specific example, in an Internet of Things (IoT) scenario, a WD may represent a machine or other device that performs monitoring and/or measurements, and transmits the results of such monitoring and/or measurements to another WD and/or a network node. The WD may in this case be a Machine-to-Machine (M2M) device, which may in a 3GPP context be referred to as a Machine-Type Communication (MTC) device. As one particular example, the WD may be a UE implementing the 3GPP Narrowband IoT (NB-IoT) standard. Particular examples of such machines or devices are sensors, metering devices such as power meters, industrial machinery, home or personal appliances (e.g., refrigerators, televisions, etc.), or personal wearables (e.g., watches, fitness trackers, etc.). In other scenarios, a WD may represent a vehicle or other equipment that is capable of monitoring and/or reporting on its operational status or other functions associated with its operation. A WD as described above may represent the endpoint of a wireless connection, in which case the device may be referred to as a wireless terminal. Furthermore, a WD as described above may be mobile, in which case it may also be referred to as a mobile device or a mobile terminal.

As illustrated in FIG. 10, a WD 1010 includes an antenna 1011, an interface 1014, processing circuitry 1020, a device readable medium 1030, user interface equipment 1032, auxiliary equipment 1034, a power source 1036, and power circuitry 1037. The WD 1010 may include multiple sets of one or more of the illustrated components for different wireless technologies supported by the WD 1010, such as, for example, GSM, WCDMA, LTE, NR, WiFi, WiMAX, or Bluetooth wireless technologies, just to mention a few. These wireless technologies may be integrated into the same or different chips or set of chips as other components within the WD 1010.

The antenna 1011 may include one or more antennas or antenna arrays configured to send and/or receive wireless signals and is connected to the interface 1014. In certain alternative embodiments, the antenna 1011 may be separate from the WD 1010 and be connectable to the WD 1010 through an interface or port. The antenna 1011, the interface 1014, and/or the processing circuitry 1020 may be configured to perform any receiving or transmitting operations described herein as being performed by a WD. Any information, data, and/or signals may be received from a network node and/or another WD. In some embodiments, radio front end circuitry and/or the antenna 1011 may be considered an interface.

As illustrated, the interface 1014 comprises radio front end circuitry 1012 and the antenna 1011. The radio front end circuitry 1012 comprises one or more filters 1018 and amplifiers 1016. The radio front end circuitry 1012 is connected to the antenna 1011 and the processing circuitry 1020 and is configured to condition signals communicated between the antenna 1011 and the processing circuitry 1020. The radio front end circuitry 1012 may be coupled to or be a part of the antenna 1011. In some embodiments, the WD 1010 may not include separate radio front end circuitry 1012; rather, the processing circuitry 1020 may comprise radio front end circuitry and may be connected to the antenna 1011. Similarly, in some embodiments, some or all of RF transceiver circuitry 1022 may be considered a part of the interface 1014. The radio front end circuitry 1012 may receive digital data that is to be sent out to other network nodes or WDs via a wireless connection. The radio front end circuitry 1012 may convert the digital data into a radio signal having the appropriate channel and bandwidth parameters using a combination of the filters 1018 and/or the amplifiers 1016. The radio signal may then be transmitted via the antenna 1011. Similarly, when receiving data, the antenna 1011 may collect radio signals which are then converted into digital data by the radio front end circuitry 1012. The digital data may be passed to the processing circuitry 1020. In other embodiments, the interface 1014 may comprise different components and/or different combinations of components.

The processing circuitry 1020 may comprise a combination of one or more of a microprocessor, a controller, a microcontroller, a CPU, a DSP, an ASIC, a FPGA, or any other suitable computing device, resource, or combination of hardware, software, and/or encoded logic operable to provide, either alone or in conjunction with other WD 1010 components, such as the device readable medium 1030, WD 1010 functionality. Such functionality may include providing any of the various wireless features or benefits discussed herein. For example, the processing circuitry 1020 may execute instructions stored in the device readable medium 1030 or in memory within the processing circuitry 1020 to provide the functionality disclosed herein.

As illustrated, the processing circuitry 1020 includes one or more of the RF transceiver circuitry 1022, baseband processing circuitry 1024, and application processing circuitry 1026. In other embodiments, the processing circuitry 1020 may comprise different components and/or different combinations of components. In certain embodiments, the processing circuitry 1020 of the WD 1010 may comprise a SOC. In some embodiments, the RF transceiver circuitry 1022, the baseband processing circuitry 1024, and the application processing circuitry 1026 may be on separate chips or sets of chips. In alternative embodiments, part or all of the baseband processing circuitry 1024 and the application processing circuitry 1026 may be combined into one chip or set of chips, and the RF transceiver circuitry 1022 may be on a separate chip or set of chips. In still alternative embodiments, part or all of the RF transceiver circuitry 1022 and the baseband processing circuitry 1024 may be on the same chip or set of chips, and the application processing circuitry 1026 may be on a separate chip or set of chips. In yet other alternative embodiments, part or all of the RF transceiver circuitry 1022, the baseband processing circuitry 1024, and the application processing circuitry 1026 may be combined in the same chip or set of chips. In some embodiments, the RF transceiver circuitry 1022 may be a part of the interface 1014. The RF transceiver circuitry 1022 may condition RF signals for the processing circuitry 1020.

In certain embodiments, some or all of the functionality described herein as being performed by a WD may be provided by the processing circuitry 1020 executing instructions stored on the device readable medium 1030, which in certain embodiments may be a computer-readable storage medium. In alternative embodiments, some or all of the functionality may be provided by the processing circuitry 1020 without executing instructions stored on a separate or discrete device readable storage medium, such as in a hard-wired manner In any of those particular embodiments, whether executing instructions stored on a device readable storage medium or not, the processing circuitry 1020 can be configured to perform the described functionality. The benefits provided by such functionality are not limited to the processing circuitry 1020 alone or to other components of the WD 1010, but are enjoyed by the WD 1010 as a whole, and/or by end users and the wireless network generally.

The processing circuitry 1020 may be configured to perform any determining, calculating, or similar operations (e.g., certain obtaining operations) described herein as being performed by a WD. These operations, as performed by the processing circuitry 1020, may include processing information obtained by the processing circuitry 1020 by, for example, converting the obtained information into other information, comparing the obtained information or converted information to information stored by the WD 1010, and/or performing one or more operations based on the obtained information or converted information, and as a result of said processing making a determination.

The device readable medium 1030 may be operable to store a computer program; software; an application including one or more of logic, rules, code, tables, etc.; and/or other instructions capable of being executed by the processing circuitry 1020. The device readable medium 1030 may include computer memory (e.g., RAM or ROM), mass storage media (e.g., a hard disk), removable storage media (e.g., a CD or a DVD), and/or any other volatile or non-volatile, non-transitory device readable and/or computer executable memory devices that store information, data, and/or instructions that may be used by the processing circuitry 1020. In some embodiments, the processing circuitry 1020 and the device readable medium 1030 may be considered to be integrated.

The user interface equipment 1032 may provide components that allow for a human user to interact with the WD 1010. Such interaction may be of many forms, such as visual, audial, tactile, etc. The user interface equipment 1032 may be operable to produce output to the user and to allow the user to provide input to the WD 1010. The type of interaction may vary depending on the type of user interface equipment 1032 installed in the WD 1010. For example, if the WD 1010 is a smart phone, the interaction may be via a touch screen; if the WD 1010 is a smart meter, the interaction may be through a screen that provides usage (e.g., the number of gallons used) or a speaker that provides an audible alert (e.g., if smoke is detected). The user interface equipment 1032 may include input interfaces, devices and circuits, and output interfaces, devices and circuits. The user interface equipment 1032 is configured to allow input of information into the WD 1010, and is connected to the processing circuitry 1020 to allow the processing circuitry 1020 to process the input information. The user interface equipment 1032 may include, for example, a microphone, a proximity or other sensor, keys/buttons, a touch display, one or more cameras, a Universal Serial Bus (USB) port, or other input circuitry. The user interface equipment 1032 is also configured to allow output of information from the WD 1010 and to allow the processing circuitry 1020 to output information from the WD 1010. The user interface equipment 1032 may include, for example, a speaker, a display, vibrating circuitry, a USB port, a headphone interface, or other output circuitry. Using one or more input and output interfaces, devices, and circuits of the user interface equipment 1032, the WD 1010 may communicate with end users and/or the wireless network, and allow them to benefit from the functionality described herein.

The auxiliary equipment 1034 is operable to provide more specific functionality which may not be generally performed by WDs. This may comprise specialized sensors for doing measurements for various purposes, interfaces for additional types of communication such as wired communications, etc. The inclusion and type of components of the auxiliary equipment 1034 may vary depending on the embodiment and/or scenario.

The power source 1036 may, in some embodiments, be in the form of a battery or battery pack. Other types of power sources, such as an external power source (e.g., an electricity outlet), photovoltaic devices, or power cells may also be used. The WD 1010 may further comprise the power circuitry 1037 for delivering power from the power source 1036 to the various parts of the WD 1010 which need power from the power source 1036 to carry out any functionality described or indicated herein. The power circuitry 1037 may in certain embodiments comprise power management circuitry. The power circuitry 1037 may additionally or alternatively be operable to receive power from an external power source, in which case the WD 1010 may be connectable to the external power source (such as an electricity outlet) via input circuitry or an interface such as an electrical power cable. The power circuitry 1037 may also in certain embodiments be operable to deliver power from an external power source to the power source 1036. This may be, for example, for the charging of the power source 1036. The power circuitry 1037 may perform any formatting, converting, or other modification to the power from the power source 1036 to make the power suitable for the respective components of the WD 1010 to which power is supplied.

Figure 11:
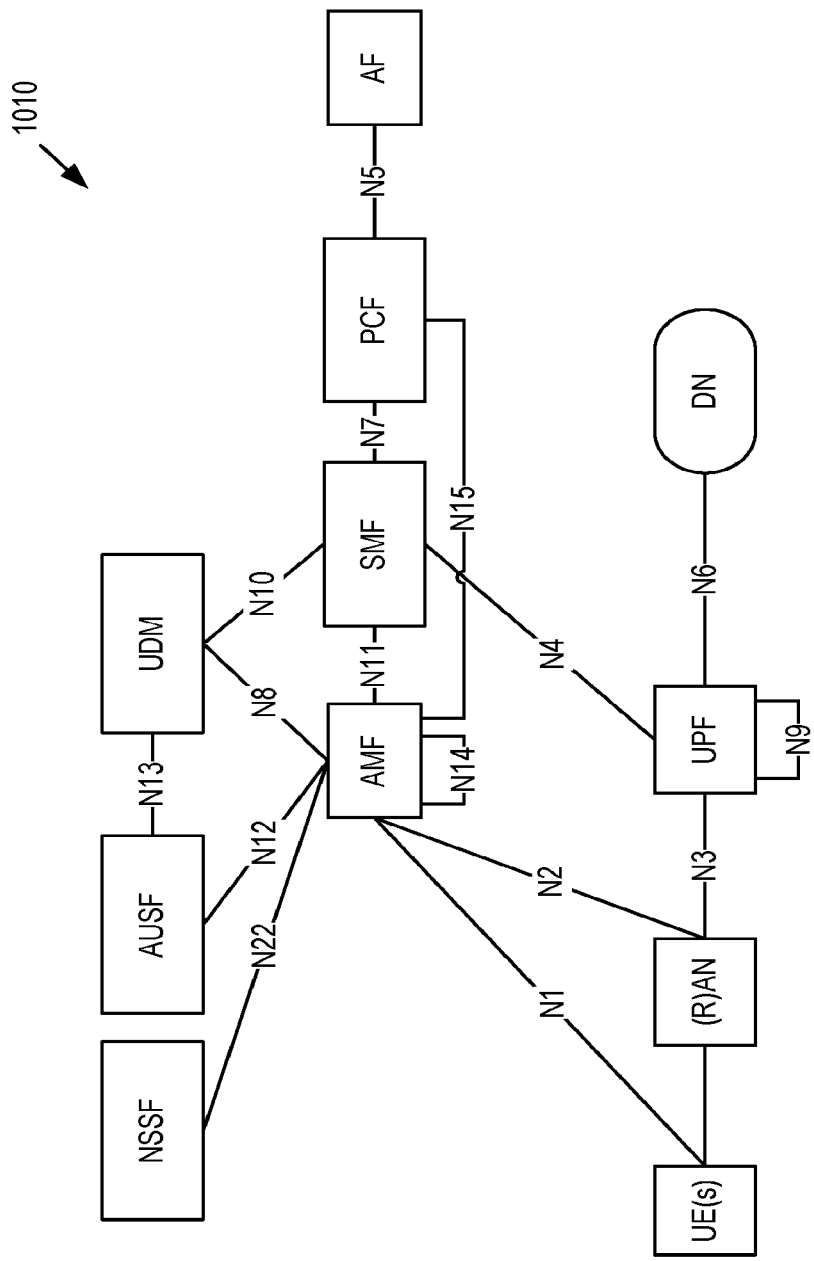
FIG. 11 illustrates a wireless communication system represented as a Fifth Generation (5G) network architecture composed of core Network Functions (NFs), where interaction between any two NFs is represented by a point-to-point reference point/interface.

FIG. 11 illustrates a wireless communication system represented as a 5G network architecture composed of core Network Functions (NFs), where interaction between any two NFs is represented by a point-to-point reference point/ interface. FIG. 11 can be viewed as one particular implementation of the system 1000 of FIG. 10.

Seen from the access side the 5G network architecture shown in FIG. 11 comprises a plurality of UEs connected to either a RAN or an Access Network (AN) as well as an Access and Mobility Management Function (AMF). Typically, the R(AN) comprises base stations, e.g. such as eNBs or gNBs or similar. Seen from the CN side, the 5G core NFs shown in FIG. 11 include a Network Slice Selection Function (NSSF), an Authentication Server Function (AUSF), a Unified Data Management (UDM), an AMF, a Session Management Function (SMF), a Policy Control Function (PCF), and an Application Function (AF).

Reference point representations of the 5G network architecture are used to develop detailed call flows in the normative standardization. The N1 reference point is defined to carry signaling between the UE and AMF. The reference points for connecting between the AN and AMF and between the AN and UPF are defined as N2 and N3, respectively. There is a reference point, N11, between the AMF and SMF, which implies that the SMF is at least partly controlled by the AMF. N4 is used by the SMF and UPF so that the UPF can be set using the control signal generated by the SMF, and the UPF can report its state to the SMF. N9 is the reference point for the connection between different UPFs, and N14 is the reference point connecting between different AMFs, respectively. N15 and N7 are defined since the PCF applies policy to the AMF and SMP, respectively. N12 is required for the AMF to perform authentication of the UE. N8 and N10 are defined because the subscription data of the UE is required for the AMF and SMF.

The 5G core network aims at separating user plane and control plane. The user plane carries user traffic while the control plane carries signaling in the network. In FIG. 11, the UPF is in the user plane and all other NFs, i.e., the AMF, SMF, PCF, AF, AUSF, and UDM, are in the control plane. Separating the user and control planes guarantees each plane resource to be scaled independently. It also allows UPFs to be deployed separately from control plane functions in a distributed fashion. In this architecture, UPFs may be deployed very close to UEs to shorten the Round Trip Time (RTT) between UEs and data network for some applications requiring low latency.

The core 5G network architecture is composed of modularized functions. For example, the AMF and SMF are independent functions in the control plane. Separated AMF and SMF allow independent evolution and scaling. Other control plane functions like the PCF and AUSF can be separated as shown in FIG. 11. Modularized function design enables the 5G core network to support various services flexibly.

Each NF interacts with another NF directly. It is possible to use intermediate functions to route messages from one NF to another NF. In the control plane, a set of interactions between two NFs is defined as service so that its reuse is possible. This service enables support for modularity. The user plane supports interactions such as forwarding operations between different UPFs.

Figure 12:
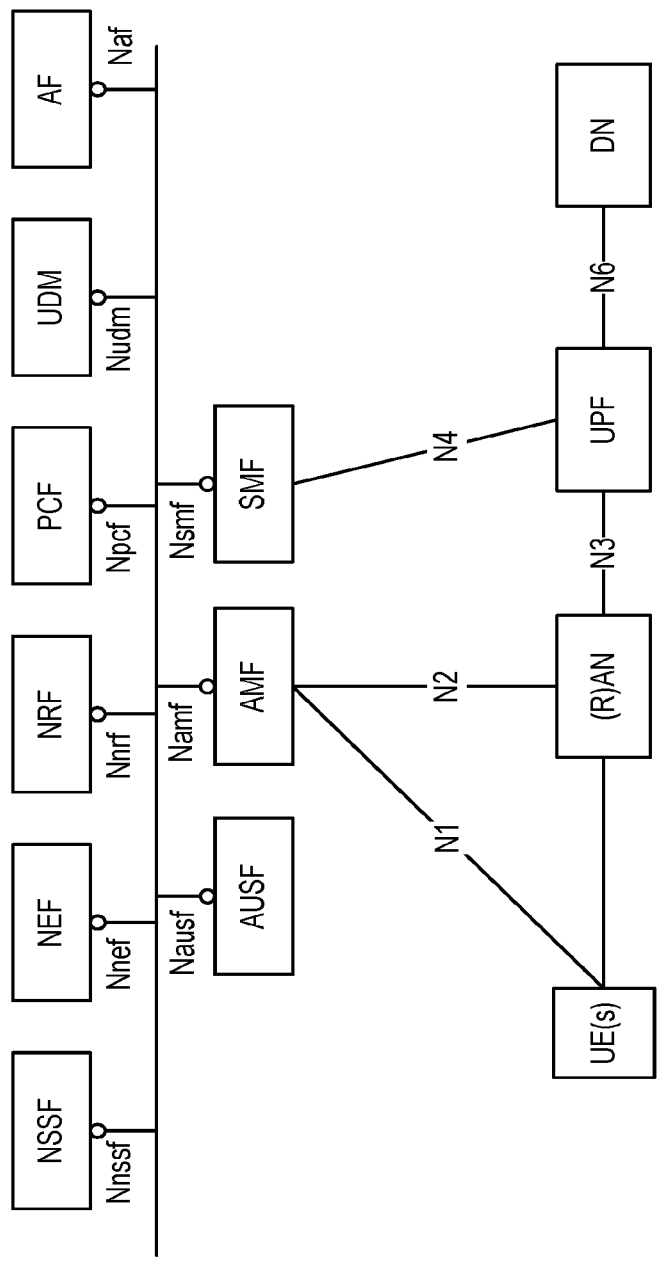
FIG. 12 illustrates a 5G network architecture using service-based interfaces between the NFs in the control plane, instead of the point-to-point reference points/interfaces used in the 5G network architecture of FIG. 11.

FIG. 12 illustrates a 5G network architecture using service-based interfaces between the NFs in the control plane, instead of the point-to-point reference points/interfaces used in the 5G network architecture of FIG. 11. However, the NFs described above with reference to FIG. 11 correspond to the NFs shown in FIG. 12. The service(s) etc. that a NF provides to other authorized NFs can be exposed to the authorized NFs through the service-based interface. In FIG. 12 the service based interfaces are indicated by the letter "N" followed by the name of the NF, e.g. Namf for the service based interface of the AMF and Nsmf for the service based interface of the SMF etc. The Network Exposure Function (NEF) and the Network Repository Function (NRF) in FIG. 12 are not shown in FIG. 11 discussed above. However, it should be clarified that all NFs depicted in FIG. 11 can interact with the NEF and the NRF of FIG. 12 as necessary, though not explicitly indicated in FIG. 11.

Some properties of the NFs shown in FIGS. 11 and 12 may be described in the following manner. The AMF provides UE-based authentication, authorization, mobility management, etc. A UE even using multiple access technologies is basically connected to a single AMF because the AMF is independent of the access technologies. The SMF is responsible for session management and allocates IP addresses to UEs. It also selects and controls the UPF for data transfer. If a UE has multiple sessions, different SMFs may be allocated to each session to manage them individually and possibly provide different functionalities per session. The AF provides information on the packet flow to the PCF responsible for policy control in order to support Quality of Service (QoS). Based on the information, the PCF determines policies about mobility and session management to make the AMF and SMF operate properly. The AUSF supports authentication function for UEs or similar and thus stores data for authentication of UEs or similar while the UDM stores subscription data of the UE. The Data Network (DN), not part of the 5G core network, provides Internet access or operator services and similar.

An NF may be implemented either as a network element on a dedicated hardware, as a software instance running on a dedicated hardware, or as a virtualized function instantiated on an appropriate platform, e.g., a cloud infrastructure.

Figure 13:
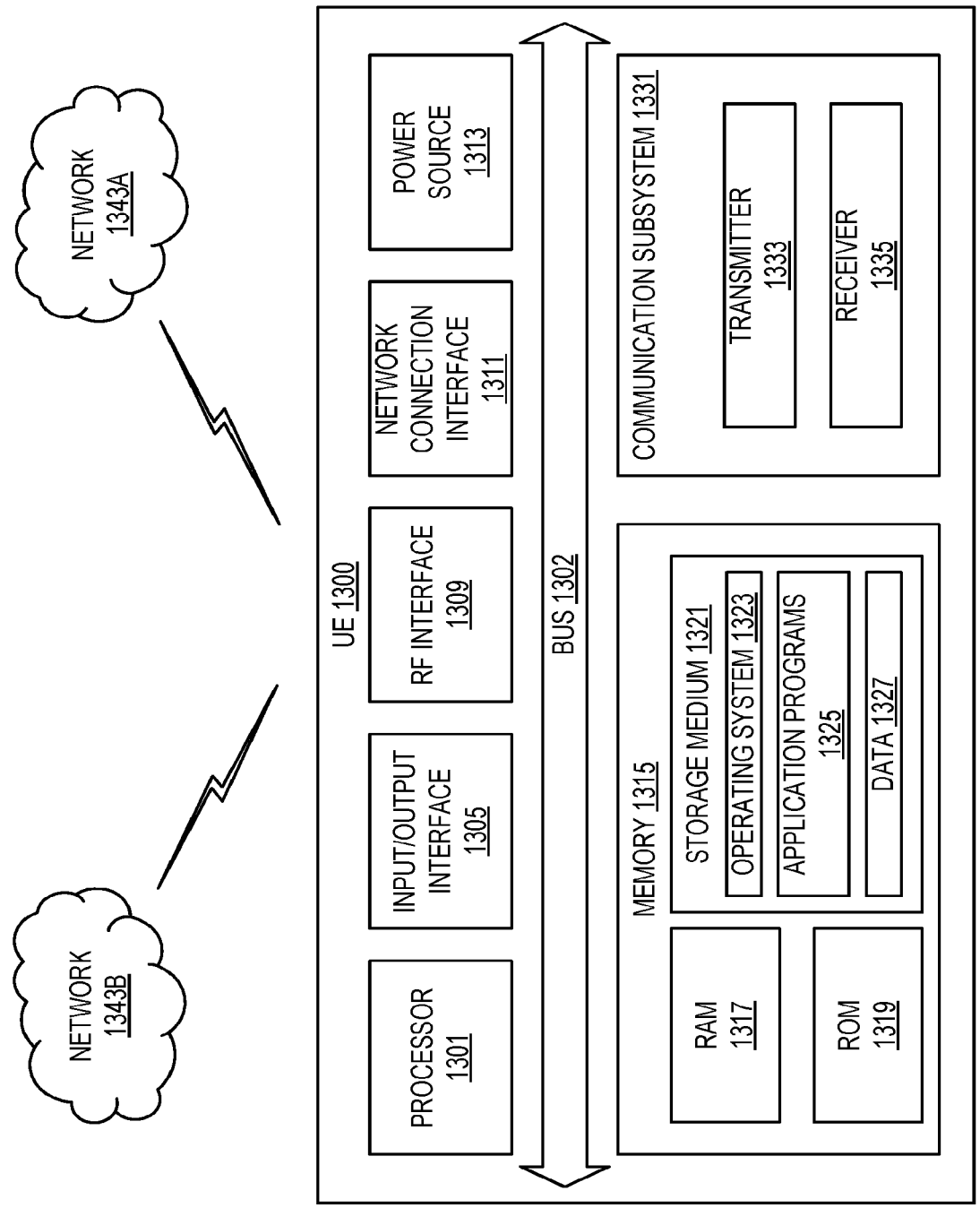
FIG. 13 illustrates one example of a UE in which embodiments of the present disclosure may be implemented.

FIG. 13 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). A UE 1300 may be any UE identified by 3GPP, including a NB-IoT UE, a MTC UE, and/or an enhanced MTC (eMTC) UE. The UE 1300, as illustrated in FIG. 13, is one example of a WD configured for communication in accordance with one or more communication standards promulgated by 3GPP, such as 3GPP's GSM, UMTS, LTE, and/or 5G standards. As mentioned previously, the term WD and UE may be used interchangeable. Accordingly, although FIG. 13 is a UE, the components discussed herein are equally applicable to a WD, and vice-versa.

In FIG. 13, the UE 1300 includes processing circuitry 1301 that is operatively coupled to an input/output interface 1305, an RF interface 1309, a network connection interface 1311, memory 1315 including RAM 1317, ROM 1319, and a storage medium 1321 or the like, a communication subsystem 1331, a power source 1313, and/or any other component, or any combination thereof. The storage medium 1321 includes an operating system 1323, an application program 1325, and data 1327. In other embodiments, the storage medium 1321 may include other similar types of information. Certain UEs may utilize all of the components shown in FIG. 13, or only a subset of the components. The level of integration between the components may vary from one UE to another UE. Further, certain UEs may contain multiple instances of a component, such as multiple processors, memories, transceivers, transmitters, receivers, etc.

In FIG. 13, the processing circuitry 1301 may be configured to process computer instructions and data. The processing circuitry 1301 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored programs, general purpose processors, such as a microprocessor or DSP, together with appropriate software; or any combination of the above. For example, the processing circuitry 1301 may include two CPUs. Data may be information in a form suitable for use by a computer.

In the depicted embodiment, the input/output interface 1305 may be configured to provide a communication interface to an input device, output device, or input and output device. The UE 1300 may be configured to use an output device via the input/output interface 1305. An output device may use the same type of interface port as an input device. For example, a USB port may be used to provide input to and output from the UE 1300. The output device may be a speaker, a sound card, a video card, a display, a monitor, a printer, an actuator, an emitter, a smartcard, another output device, or any combination thereof. The UE 1300 may be configured to use an input device via the input/output interface 1305 to allow a user to capture information into the UE 1300. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 13, the RF interface 1309 may be configured to provide a communication interface to RF components such as a transmitter, a receiver, and an antenna. The network connection interface 1311 may be configured to provide a communication interface to a network 1343A. The network 1343A may encompass wired and/or wireless networks such as a LAN, a WAN, a computer network, a wireless network, a telecommunications network, another like network or any combination thereof. For example, the network 1343A may comprise a WiFi network. The network connection interface 1311 may be configured to include a receiver and a transmitter interface used to communicate with one or more other devices over a communication network according to one or more communication protocols, such as Ethernet, Transmission Control Protocol (TCP)/IP, Synchronous Optical Networking (SONET), Asynchronous Transfer Mode (ATM), or the like. The network connection interface 1311 may implement receiver and transmitter functionality appropriate to the communication network links (e.g., optical, electrical, and the like). The transmitter and receiver functions may share circuit components, software, or firmware, or alternatively may be implemented separately.

The RAM 1317 may be configured to interface via a bus 1302 to the processing circuitry 1301 to provide storage or caching of data or computer instructions during the execution of software programs such as the operating system, application programs, and device drivers. The ROM 1319 may be configured to provide computer instructions or data to the processing circuitry 1301. For example, the ROM 1319 may be configured to store invariant low-level system code or data for basic system functions such as basic Input and Output (I/O), startup, or reception of keystrokes from a keyboard that are stored in a non-volatile memory. The storage medium 1321 may be configured to include memory such as RAM, ROM, Programmable ROM (PROM), Erasable PROM (EPROM), Electrically EPROM (EEPROM), magnetic disks, optical disks, floppy disks, hard disks, removable cartridges, or flash drives. In one example, the storage medium 1321 may be configured to include the operating system 1323, the application program 1325 such as a web browser application, a widget or gadget engine, or another application, and the data file 1327. The storage medium 1321 may store, for use by the UE 1300, any of a variety of various operating systems or combinations of operating systems.

The storage medium 1321 may be configured to include a number of physical drive units, such as a Redundant Array of Independent Disks (RAID), a floppy disk drive, flash memory, a USB flash drive, an external hard disk drive, a thumb drive, a pen drive, a key drive, a High-Density Digital Versatile Disc (HD-DVD) optical disc drive, an internal hard disk drive, a Blu-Ray optical disc drive, a Holographic Digital Data Storage (HDDS) optical disc drive, an external mini-Dual In-Line Memory Module (DIMM), Synchronous Dynamic RAM (SDRAM), external micro-DIMM SDRAM, smartcard memory such as a Subscriber Identity Module (SIM) or a Removable User Identity (RUIM) module, other memory, or any combination thereof. The storage medium 1321 may allow the UE 1300 to access computer-executable instructions, application programs, or the like, stored on transitory or non-transitory memory media, to off-load data or to upload data. An article of manufacture, such as one utilizing a communication system, may be tangibly embodied in the storage medium 1321, which may comprise a device readable medium.

In FIG. 13, the processing circuitry 1301 may be configured to communicate with a network 1343B using the communication subsystem 1331. The network 1343A and the network 1343B may be the same network or networks or different network or networks. The communication subsystem 1331 may be configured to include one or more transceivers used to communicate with the network 1343B. For example, the communication subsystem 1331 may be configured to include one or more transceivers used to communicate with one or more remote transceivers of another device capable of wireless communication such as another WD, UE, or base station of a RAN according to one or more communication protocols, such as IEEE 802.13, Code Division Multiple Access (CDMA), WCDMA, GSM, LTE, Universal Terrestrial RAN (UTRAN), WiMax, or the like. Each transceiver may include a transmitter 1333 and/or a receiver 1335 to implement transmitter or receiver functionality, respectively, appropriate to the RAN links (e.g., frequency allocations and the like). Further, the transmitter 1333 and the receiver 1335 of each transceiver may share circuit components, software, or firmware, or alternatively may be implemented separately.

In the illustrated embodiment, the communication functions of the communication subsystem 1331 may include data communication, voice communication, multimedia communication, short-range communications such as Bluetooth, near-field communication, location-based communication such as the use of the Global Positioning System (GPS) to determine a location, another like communication function, or any combination thereof. For example, the communication subsystem 1331 may include cellular communication, WiFi communication, Bluetooth communication, and GPS communication. The network 1343B may encompass wired and/or wireless networks such as a LAN, a WAN, a computer network, a wireless network, a telecommunications network, another like network, or any combination thereof. For example, the network 1343B may be a cellular network, a WiFi network, and/or a near-field network. A power source 1313 may be configured to provide Alternating Current (AC) or Direct Current power to components of the UE 1300.

The features, benefits, and/or functions described herein may be implemented in one of the components of the UE 1300 or partitioned across multiple components of the UE 1300. Further, the features, benefits, and/or functions described herein may be implemented in any combination of hardware, software, or firmware. In one example, the communication subsystem 1331 may be configured to include any of the components described herein. Further, the processing circuitry 1301 may be configured to communicate with any of such components over the bus 1302. In another example, any of such components may be represented by program instructions stored in memory that, when executed by the processing circuitry 1301, perform the corresponding functions described herein. In another example, the functionality of any of such components may be partitioned between the processing circuitry 1301 and the communication subsystem 1331. In another example, the non-computationally intensive functions of any of such components may be implemented in software or firmware and the computationally intensive functions may be implemented in hardware.

Figure 14:
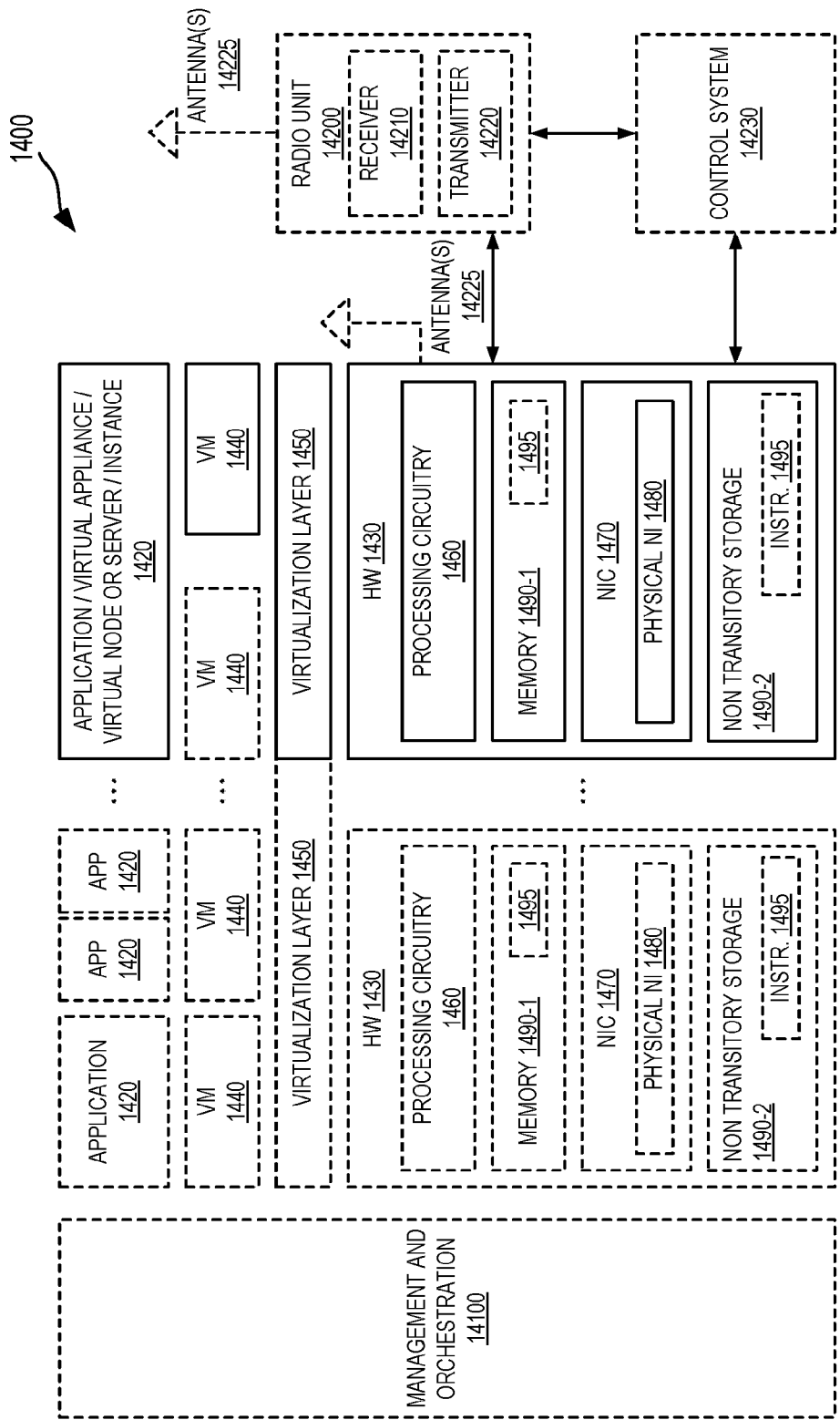
FIG. 14 is a schematic block diagram illustrating a virtualization environment in which functions implemented by some embodiments of the present disclosure may be virtualized.

FIG. 14 is a schematic block diagram illustrating a virtualization environment 1400 in which functions implemented by some embodiments may be virtualized. In the present context, virtualizing means creating virtual versions of apparatuses or devices which may include virtualizing hardware platforms, storage devices, and networking resources. As used herein, virtualization can be applied to a node (e.g., a virtualized base station or a virtualized radio access node) or to a device (e.g., a UE, a WD, or any other type of communication device) or components thereof and relates to an implementation in which at least a portion of the functionality is implemented as one or more virtual components (e.g., via one or more applications, components, functions, virtual machines, or containers executing on one or more physical processing nodes in one or more networks).

In some embodiments, some or all of the functions described herein may be implemented as virtual components executed by one or more virtual machines implemented in one or more virtual environments 1400 hosted by one or more of hardware nodes 1430. Further, in embodiments in which the virtual node is not a radio access node or does not require radio connectivity (e.g., a core network node), then the network node may be entirely virtualized.

The functions may be implemented by one or more applications 1420 (which may alternatively be called software instances, virtual appliances, network functions, virtual nodes, virtual network functions, etc.) operative to implement some of the features, functions, and/or benefits of some of the embodiments disclosed herein. The applications 1420 are run in the virtualization environment 1400 which provides hardware 1430 comprising processing circuitry 1460 and memory 1490. The memory 1490 contains instructions 1495 executable by the processing circuitry 1460 whereby the application 1420 is operative to provide one or more of the features, benefits, and/or functions disclosed herein.

The virtualization environment 1400 comprises general-purpose or special-purpose network hardware devices 1430 comprising a set of one or more processors or processing circuitry 1460, which may be Commercial Off-the-Shelf (COTS) processors, dedicated ASICs, or any other type of processing circuitry including digital or analog hardware components or special purpose processors. Each hardware device 1430 may comprise memory 1490-1 which may be non-persistent memory for temporarily storing instructions 1495 or software executed by the processing circuitry 1460. Each hardware device 1430 may comprise one or more Network Interface Controllers (NICs) 1470, also known as network interface cards, which include a physical network interface 1480. Each hardware device 1430 may also include non-transitory, persistent, machine-readable storage media 1490-2 having stored therein software 1495 and/or instructions executable by the processing circuitry 1460. The software 1495 may include any type of software including software for instantiating one or more virtualization layers 1450 (also referred to as hypervisors), software to execute virtual machines 1440, as well as software allowing it to execute functions, features, and/or benefits described in relation with some embodiments described herein.

The virtual machines 1440, comprise virtual processing, virtual memory, virtual networking or interface, and virtual storage, and may be run by a corresponding virtualization layer 1450 or hypervisor. Different embodiments of the instance of virtual appliance 1420 may be implemented on one or more of the virtual machines 1440, and the implementations may be made in different ways.

During operation, the processing circuitry 1460 executes the software 1495 to instantiate the hypervisor or virtualization layer 1450, which may sometimes be referred to as a Virtual Machine Monitor (VMM). The virtualization layer 1450 may present a virtual operating platform that appears like networking hardware to the virtual machine 1440.

As shown in FIG. 14, the hardware 1430 may be a standalone network node with generic or specific components. The hardware 1430 may comprise an antenna 14225 and may implement some functions via virtualization. Alternatively, the hardware 1430 may be part of a larger cluster of hardware (e.g., such as in a data center or CPE) where many hardware nodes work together and are managed via a Management and Orchestration (MANO) 14100, which, among others, oversees lifecycle management of the applications 1420.

Virtualization of the hardware is in some contexts referred to as Network Function Virtualization (NFV). NFV may be used to consolidate many network equipment types onto industry standard high volume server hardware, physical switches, and physical storage, which can be located in data centers and CPE.

In the context of NFV, the virtual machine 1440 may be a software implementation of a physical machine that runs programs as if they were executing on a physical, non-virtualized machine. Each of the virtual machines 1440, and that part of the hardware 1430 that executes that virtual machine 1440, be it hardware dedicated to that virtual machine 1440 and/or hardware shared by that virtual machine 1440 with others of the virtual machines 1440, forms a separate Virtual Network Element (VNE).

Still in the context of NFV, Virtual Network Function (VNF) is responsible for handling specific network functions that run in one or more virtual machines 1440 on top of the hardware networking infrastructure 1430 and corresponds to the application 1420 in FIG. 14.

In some embodiments, one or more radio units 14200 that each include one or more transmitters 14220 and one or more receivers 14210 may be coupled to the one or more antennas 14225. The radio units 14200 may communicate directly with the hardware nodes 1430 via one or more appropriate network interfaces and may be used in combination with the virtual components to provide a virtual node with radio capabilities, such as a radio access node or a base station.

In some embodiments, some signaling can be effected with the use of a control system 14230, which may alternatively be used for communication between the hardware nodes 1430 and the radio unit 14200.

Figure 15:
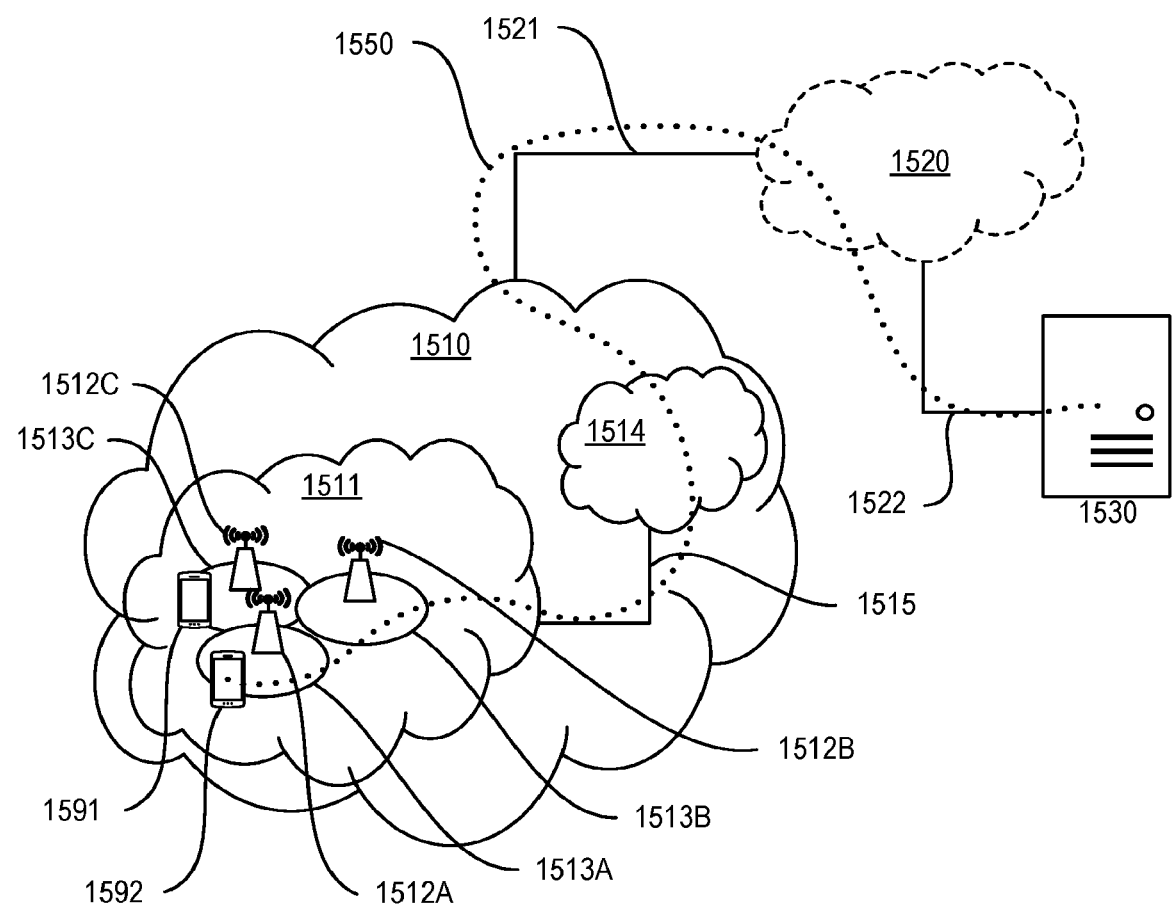
FIG. 15 illustrates an example communication system in which embodiments of the present disclosure may be implemented.

With reference to FIG. 15, in accordance with an embodiment, a communication system includes a telecommunication network 1510, such as a 3GPP-type cellular network, which comprises an access network 1511, such as a RAN, and a core network 1514. The access network 1511 comprises a plurality of base stations 1512A, 1512B, 1512C, such as Node Bs, eNBs, gNBs, or other types of wireless APs, each defining a corresponding coverage area 1513A, 1513B, 1513C. Each base station 1512A, 1512B, 1512C is connectable to the core network 1514 over a wired or wireless connection 1515. A first UE 1591 located in coverage area 1513C is configured to wirelessly connect to, or be paged by, the corresponding base station 1512C. A second UE 1592 in coverage area 1513A is wirelessly connectable to the corresponding base station 1512A. While a plurality of UEs 1591, 1592 are illustrated in this example, the disclosed embodiments are equally applicable to a situation where a sole UE is in the coverage area or where a sole UE is connecting to the corresponding base station 1512.

The telecommunication network 1510 is itself connected to a host computer 1530, which may be embodied in the hardware and/or software of a standalone server, a cloud-implemented server, a distributed server, or as processing resources in a server farm. The host computer 1530 may be under the ownership or control of a service provider, or may be operated by the service provider or on behalf of the service provider. Connections 1521 and 1522 between telecommunication network 1510 and the host computer 1530 may extend directly from the core network 1514 to the host computer 1530 or may go via an optional intermediate network 1520. The intermediate network 1520 may be one of, or a combination of more than one of, a public, private, or hosted network; the intermediate network 1520, if any, may be a backbone network or the Internet; in particular, the intermediate network 1520 may comprise two or more sub-networks (not shown).

The communication system of FIG. 15 as a whole enables connectivity between the connected UEs 1591, 1592 and the host computer 1530. The connectivity may be described as an Over-the-Top (OTT) connection 1550. The host computer 1530 and the connected UEs 1591, 1592 are configured to communicate data and/or signaling via the OTT connection 1550, using the access network 1511, the core network 1514, any intermediate network 1520, and possible further infrastructure (not shown) as intermediaries. The OTT connection 1550 may be transparent in the sense that the participating communication devices through which the OTT connection 1550 passes are unaware of routing of uplink and downlink communications. For example, the base station 1512 may not or need not be informed about the past routing of an incoming downlink communication with data originating from the host computer 1530 to be forwarded (e.g., handed over) to a connected UE 1591. Similarly, the base station 1512 need not be aware of the future routing of an outgoing uplink communication originating from the UE 1591 towards the host computer 1530.

Example implementations, in accordance with an embodiment, of the UE, base station, and host computer discussed in the preceding paragraphs will now be described with reference to FIG. 16. In a communication system 1600, a host computer 1610 comprises hardware 1615 including a communication interface 1616 configured to set up and maintain a wired or wireless connection with an interface of a different communication device of the communication system 1600. The host computer 1610 further comprises processing circuitry 1618, which may have storage and/or processing capabilities. In particular, the processing circuitry 1618 may comprise one or more programmable processors, ASICs, FPGAs, or combinations of these (not shown) adapted to execute instructions. The host computer 1610 further comprises software 1611, which is stored in or accessible by the host computer 1610 and executable by the processing circuitry 1618. The software 1611 includes a host application 1612. The host application 1612 may be operable to provide a service to a remote user, such as a UE 1630 connecting via an OTT connection 1650 terminating at the UE 1630 and the host computer 1610. In providing the service to the remote user, the host application 1612 may provide user data which is transmitted using the OTT connection 1650.

The communication system 1600 further includes a base station 1620 provided in a telecommunication system and comprising hardware 1625 enabling it to communicate with the host computer 1610 and with the UE 1630. The hardware 1625 may include a communication interface 1626 for setting up and maintaining a wired or wireless connection with an interface of a different communication device of the communication system 1600, as well as a radio interface 1627 for setting up and maintaining at least a wireless connection 1670 with the UE 1630 located in a coverage area (not shown in FIG. 16) served by the base station 1620. The communication interface 1626 may be configured to facilitate a connection 1660 to the host computer 1610. The connection 1660 may be direct or it may pass through a core network (not shown in FIG. 16) of the telecommunication system and/or through one or more intermediate networks outside the telecommunication system. In the embodiment shown, the hardware 1625 of the base station 1620 further includes processing circuitry 1628, which may comprise one or more programmable processors, ASICs, FPGAs, or combinations of these (not shown) adapted to execute instructions. The base station 1620 further has software 1621 stored internally or accessible via an external connection.

The communication system 1600 further includes the UE 1630 already referred to. The UE's 1630 hardware 1635 may include a radio interface 1637 configured to set up and maintain a wireless connection 1670 with a base station serving a coverage area in which the UE 1630 is currently located. The hardware 1635 of the UE 1630 further includes processing circuitry 1638, which may comprise one or more programmable processors, ASICs, FPGAs, or combinations of these (not shown) adapted to execute instructions. The UE 1630 further comprises software 1631, which is stored in or accessible by the UE 1630 and executable by the processing circuitry 1638. The software 1631 includes a client application 1632. The client application 1632 may be operable to provide a service to a human or non-human user via the UE 1630, with the support of the host computer 1610. In the host computer 1610, the executing host application 1612 may communicate with the executing client application 1632 via the OTT connection 1650 terminating at the UE 1630 and the host computer 1610. In providing the service to the user, the client application 1632 may receive request data from the host application 1612 and provide user data in response to the request data. The OTT connection 1650 may transfer both the request data and the user data. The client application 1632 may interact with the user to generate the user data that it provides.

Figure 16:
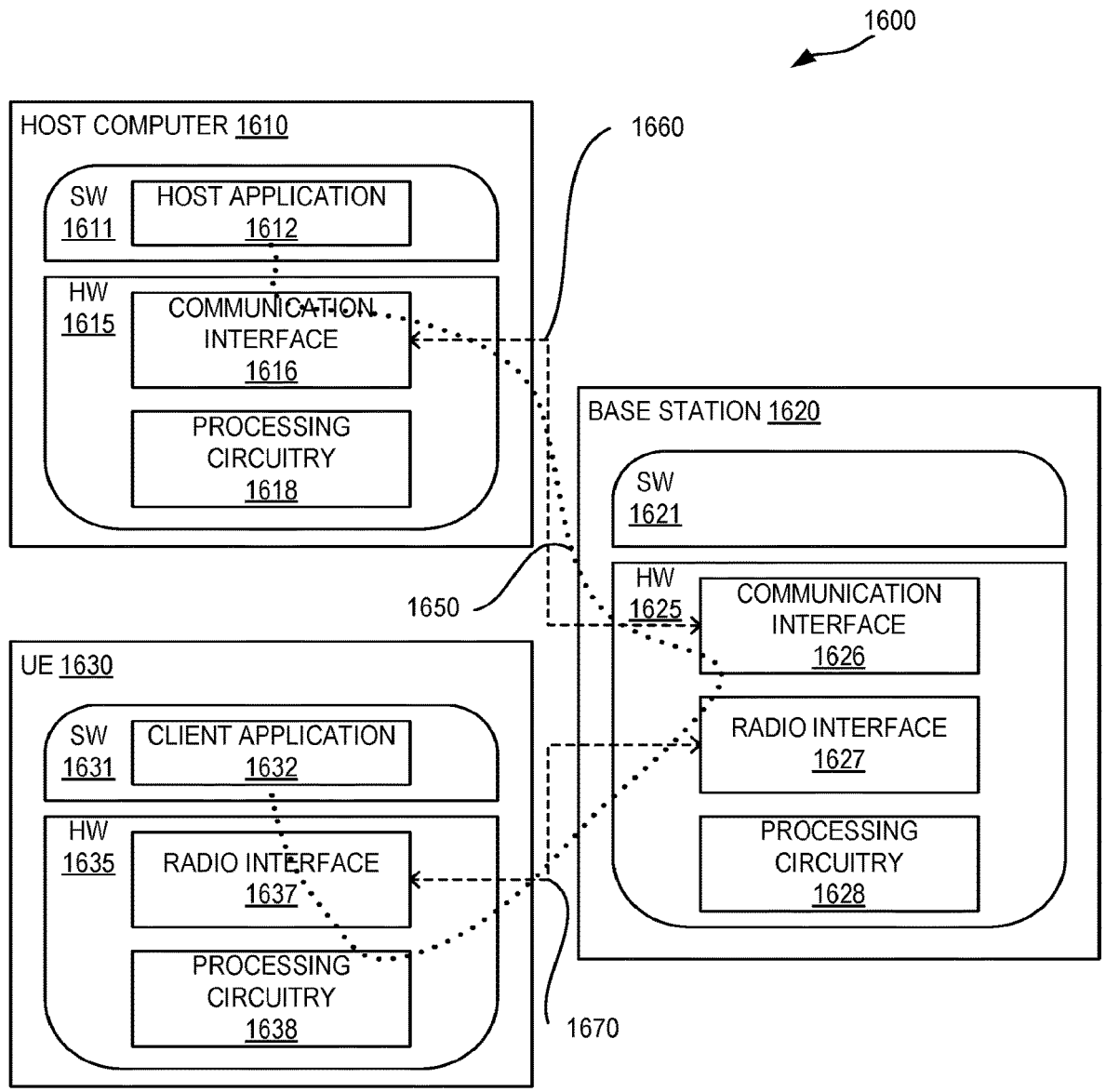
FIG. 16 illustrates an example implementation of the UE, base station, and host computer of FIG. 15.

It is noted that the host computer 1610, the base station 1620, and the UE 1630 illustrated in FIG. 16 may be similar or identical to the host computer 1530, one of the base stations 1512A, 1512B, 1512C, and one of the UEs 1591, 1592 of FIG. 15, respectively. This is to say, the inner workings of these entities may be as shown in FIG. 16 and independently, the surrounding network topology may be that of FIG. 15.

In FIG. 16, the OTT connection 1650 has been drawn abstractly to illustrate the communication between the host computer 1610 and the UE 1630 via the base station 1620 without explicit reference to any intermediary devices and the precise routing of messages via these devices. The network infrastructure may determine the routing, which may be configured to hide from the UE 1630 or from the service provider operating the host computer 1610, or both. While the OTT connection 1650 is active, the network infrastructure may further take decisions by which it dynamically changes the routing (e.g., on the basis of load balancing consideration or reconfiguration of the network).

The wireless connection 1670 between the UE 1630 and the base station 1620 is in accordance with the teachings of the embodiments described throughout this disclosure. One or more of the various embodiments improve the performance of OTT services provided to the UE 1630 using the OTT connection 1650, in which the wireless connection 1670 forms the last segment.

A measurement procedure may be provided for the purpose of monitoring data rate, latency, and other factors on which the one or more embodiments improve. There may further be an optional network functionality for reconfiguring the OTT connection 1650 between the host computer 1610 and the UE 1630, in response to variations in the measurement results. The measurement procedure and/or the network functionality for reconfiguring the OTT connection 1650 may be implemented in the software 1611 and the hardware 1615 of the host computer 1610 or in the software 1631 and the hardware 1635 of the UE 1630, or both. In some embodiments, sensors (not shown) may be deployed in or in association with communication devices through which the OTT connection 1650 passes; the sensors may participate in the measurement procedure by supplying values of the monitored quantities exemplified above, or supplying values of other physical quantities from which the software 1611, 1631 may compute or estimate the monitored quantities. The reconfiguring of the OTT connection 1650 may include message format, retransmission settings, preferred routing, etc.; the reconfiguring need not affect the base station 1620, and it may be unknown or imperceptible to the base station 1620. Such procedures and functionalities may be known and practiced in the art. In certain embodiments, measurements may involve proprietary UE signaling facilitating the host computer 1610's measurements of throughput, propagation times, latency, and the like. The measurements may be implemented in that the software 1611 and 1631 causes messages to be transmitted, in particular empty or 'dummy' messages, using the OTT connection 1650 while it monitors propagation times, errors, etc.

FIG. 17 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 17 will be included in this section. In step 1710, the host computer provides user data. In sub-step 1711 (which may be optional) of step 1710, the host computer provides the user data by executing a host application. In step 1720, the host computer initiates a transmission carrying the user data to the UE. In step 1730 (which may be optional), the base station transmits to the UE the user data which was carried in the transmission that the host computer initiated, in accordance with the teachings of the embodiments described throughout this disclosure. In step 1740 (which may also be optional), the UE executes a client application associated with the host application executed by the host computer.

FIG. 18 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 18 will be included in this section. In step 1810 of the method, the host computer provides user data. In an optional sub-step (not shown) the host computer provides the user data by executing a host application. In step 1820, the host computer initiates a transmission carrying the user data to the UE. The transmission may pass via the base station, in accordance with the teachings of the embodiments described throughout this disclosure. In step 1830 (which may be optional), the UE receives the user data carried in the transmission.

FIG. 19 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 19 will be included in this section. In step 1910 (which may be optional), the UE receives input data provided by the host computer. Additionally or alternatively, in step 1920, the UE provides user data. In sub-step 1921 (which may be optional) of step 1920, the UE provides the user data by executing a client application. In sub-step 1911 (which may be optional) of step 1910, the UE executes a client application which provides the user data in reaction to the received input data provided by the host computer. In providing the user data, the executed client application may further consider user input received from the user. Regardless of the specific manner in which the user data was provided, the UE initiates, in sub-step 1930 (which may be optional), transmission of the user data to the host computer. In step 1940 of the method, the host computer receives the user data transmitted from the UE, in accordance with the teachings of the embodiments described throughout this disclosure.

FIG. 20 is a flowchart illustrating a method implemented in a communication system, in accordance with one embodiment. The communication system includes a host computer, a base station, and a UE which may be those described with reference to FIGS. 15 and 16. For simplicity of the present disclosure, only drawing references to FIG. 20 will be included in this section. In step 2010 (which may be optional), in accordance with the teachings of the embodiments described throughout this disclosure, the base station receives user data from the UE. In step 2020 (which may be optional), the base station initiates transmission of the received user data to the host computer. In step 2030 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include DSPs, special-purpose digital logic, and the like. The processing circuitry may be configured to execute program code stored in memory, which may include one or several types of memory such as ROM, RAM, cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

The term unit may have conventional meaning in the field of electronics, electrical devices, and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

At least some of the following abbreviations may be used in this disclosure. If there is an inconsistency between abbreviations, preference should be given to how it is used above. If listed multiple times below, the first listing should be preferred over any subsequent listing(s).

2G Second Generation
3G Third Generation
3GPP Third Generation Partnership Project
4G Fourth Generation
5G Fifth Generation
AC Alternating Current
AF Application Function
AMF Access and Mobility Management Function
AN Access Network
AP Access Point
AS Access Stratum
ASIC Application Specific Integrated Circuit
ATM Asynchronous Transfer Mode
AUSF Authentication Server Function
BS Base Station
BSC Base Station Controller
BTS Base Transceiver Station
CA Carrier Aggregation
CD Compact Disk
CDMA Code Division Multiple Access
CN Core Network
COTS Commercial Off-the-Shelf
CPE Customer Premise Equipment
CPU Central Processing Unit
D2D Device-to-Device
DAS Distributed Antenna System
DC Dual Connectivity
DIMM Dual In-Line Memory Module
DN Data Network
DRB Data Radio Bearer
DRX Discontinuous Reception
DSP Digital Signal Processor
DVD Digital Video Disk
EEPROM Electrically Erasable Programmable Read Only Memory
eMTC Enhanced Machine Type Communication
eNB Enhanced or Evolved Node B
EPROM Erasable Programmable Read Only Memory
E-SMLC Evolved Serving Mobile Location Center
E-UTRAN Evolved Universal Terrestrial Radio Access Network
FFS For Further Study
FPGA Field Programmable Gate Array
GHz Gigahertz
gNB New Radio Base Station
GPS Global Positioning System
GSM Global System for Mobile Communications
HDDS Holographic Digital Data Storage
HD-DVD High-Density Digital Versatile Disc
I/O Input and Output
IoT Internet of Things
IP Internet Protocol
I-RNTI Inactive Radio Network Temporary Identifier
LAN Local Area Network
LEE Laptop Embedded Equipment
LME Laptop Mounted Equipment
LTE Long Term Evolution
M2M Machine-to-Machine
MANO Management and Orchestration
MCE Multi-Cell/Multicast Coordination Entity
MCG Master Cell Group
MDT Minimization of Drive Tests
MIMO Multiple Input Multiple Output
MME Mobility Management Entity
MSC Mobile Switching Center
MSR Multi-Standard Radio
MTC Machine Type Communication
NAS Non-Access Stratum
NB-IoT Narrowband Internet of Things
NEF Network Exposure Function
NF Network Function
NFV Network Function Virtualization
NIC Network Interface Controller
NR New Radio
NRF Network Repository Function
NSSF Network Slice Selection Function
O&M Operation and Maintenance
OSS Operations Support System
OTT Over-the-Top
PCF Policy Control Function
PDA Personal Digital Assistant
PROM Programmable Read Only Memory
PSTN Public Switched Telephone Network
QoS Quality of Service
RAID Redundant Array of Independent Disks
RAM Random Access Memory
RAN Radio Access Network
RAT Radio Access Technology
RF Radio Frequency
RNA Radio Access Network based Notification Area
RNAU Radio Access Network based Notification Area Update
RNC Radio Network Controller
ROM Read Only Memory
RRC Radio Resource Control RRH Remote Radio Head
RRU Remote Radio Unit
RTT Round Trip Time
RUIM Removable User Identity
SCell Secondary Cell
SCG Secondary Cell Group
SDRAM Synchronous Dynamic Random Access Memory
SIM Subscriber Identity Module
SMF Session Management Function
SOC System on a Chip
SON Self-Organizing Network
SONET Synchronous Optical Networking
SpCell Special Cell
SRB Signaling Radio Bearer
S-TMSI System Architecture Evolution Temporary Mobile Subscriber Identity
TA Tracking Area
TCP Transmission Control Protocol
TP Text Proposal
UDM Unified Data Management
UE User Equipment
UL Uplink
UMTS Universal Mobile Telecommunications System
USB Universal Serial Bus
UTRAN Universal Terrestrial Radio Access Network
V2I Vehicle-to-Infrastructure
V2V Vehicle-to-Vehicle
V2X Vehicle-to-Everything
VMM Virtual Machine Monitor
VNE Virtual Network Element
VNF Virtual Network Function
VoIP Voice over Internet Protocol
WAN Wide Area Network
WCDMA Wideband Code Division Multiple Access
WD Wireless Device
WiMax Worldwide Interoperability for Microwave Access
WLAN Wireless Local Area Network Those skilled in the art will recognize improvements and modifications to the embodiments of the present disclosure. All such improvements and modifications are considered within the scope of the concepts disclosed herein.

What is claimed is:

1. A method of operation of a cellular communications system, the method comprising:
   receiving, by a Radio Access Network, RAN, node, a Radio Resource Control, RRC, resume request from a wireless device;
   in response to the RRC resume request, transmitting, by the RAN node, an RRC resume reject message comprising a wait timer value to the wireless device;
   receiving, by a target cell, a cell reselection from the wireless device while a wait timer initialized with the wait timer value is running; and
   upon receiving the cell reselection by the target cell while the wait timer is running, receiving a re-initiation of a pending Access Stratum, AS, layer procedure in the target cell.

2. The method of claim 1 wherein receiving the re-initiation of the pending AS layer procedure in the target cell comprises receiving the re-initiation of the pending AS layer procedure in the target cell if an upper layer event has occurred.

3. The method of claim 2 wherein the upper layer event is mobile originating data or mobile originating signaling.

4. The method of claim 1 wherein the pending AS layer procedure is a RAN-based Notification Area Update, RNAU, procedure.

5. A cellular communications system comprising a Radio Access Network, RAN, node and a target cell, the RAN node comprising:
   radio front-end circuitry; and
   processing circuitry associated with the radio front-end circuitry, the processing circuitry configured to cause the RAN node to:
      receive a Radio Resource Control, RRC, resume request from a wireless device; and
      in response to the RRC resume request, transmit an RRC resume reject message comprising a wait timer value to the wireless device; and
the target cell comprising:
   radio front-end circuitry; and
   processing circuitry associated with the radio front-end circuitry, the processing circuitry configured to cause the target cell to:
      receive a cell reselection while a wait timer initialized with the wait timer value is running; and
      upon receiving the cell reselection while the wait timer is running, receive a re-initiation of a pending Access Stratum, AS, layer procedure.

6. The cellular communications system of claim 5 wherein receiving the re-initiation of the pending AS layer procedure in the target cell comprises being configured to receive the re-initiation of the pending AS layer procedure in the target cell if an upper layer event has occurred.

7. The cellular communications system of claim 6 wherein the upper layer event is mobile originating data or mobile originating signaling.

8. The cellular communications system of claim 5 wherein the pending AS layer procedure is a RAN-based Notification Area Update, RNAU, procedure.

* * * * *